(12) United States Patent
Hunzinger

(10) Patent No.: US 6,928,285 B2
(45) Date of Patent: Aug. 9, 2005

(54) MINIMUM INTERFERENCE MULTIPLE-ACCESS METHOD AND SYSTEM FOR CONNECTION RESCUE

(75) Inventor: Jason F. Hunzinger, Carlsbad, CA (US)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/010,536

(22) Filed: Dec. 5, 2001

(65) Prior Publication Data

US 2002/0142772 A1 Oct. 3, 2002

Related U.S. Application Data

(60) Provisional application No. 60/251,670, filed on Dec. 5, 2000.

(51) Int. Cl.[7] ................................. H04Q 7/20
(52) U.S. Cl. ................. 455/438; 455/436; 455/442; 455/452.1; 455/525
(58) Field of Search ............................... 455/436, 438, 455/449, 67.1, 442, 443, 450, 452, 525; 370/342

(56) References Cited

U.S. PATENT DOCUMENTS

| | | | |
|---|---|---|---|
| 5,081,671 A | | 1/1992 | Raith et al. |
| 5,267,261 A | | 11/1993 | Blakeney, II et al. |
| 5,301,356 A | | 4/1994 | Bodin et al. |
| 5,353,332 A | | 10/1994 | Raith et al. |
| 5,530,912 A | | 6/1996 | Agrawal et al. |
| 5,640,414 A | * | 6/1997 | Blakeney et al. ............ 375/130 |
| 5,673,259 A | * | 9/1997 | Quick, Jr. .................... 370/342 |
| 5,722,044 A | * | 2/1998 | Padovani et al. ............ 455/443 |
| 5,729,826 A | * | 3/1998 | Gavrilovich ............ 455/436 X |
| 5,749,055 A | | 5/1998 | Dahlin |
| 5,781,856 A | | 7/1998 | Jacobs et al. |
| 5,884,174 A | | 3/1999 | Nagarajan et al. |
| 5,913,167 A | | 6/1999 | Bonta et al. |
| 5,937,019 A | | 8/1999 | Padovani |
| 6,052,594 A | | 4/2000 | Chuang et al. |
| 6,061,337 A | * | 5/2000 | Light et al. ................. 370/331 |
| 6,104,927 A | | 8/2000 | Willey |
| 6,161,014 A | * | 12/2000 | Girardeau et al. ........... 455/436 |
| 6,233,454 B1 | * | 5/2001 | Sato ............................ 455/437 |
| 6,236,365 B1 | * | 5/2001 | LeBlanc et al. ............. 342/457 |
| 6,246,872 B1 | | 6/2001 | Lee et al. |
| 6,253,083 B1 | | 6/2001 | Hacena et al. |
| 6,337,983 B1 | | 1/2002 | Bonta et al. |
| 6,343,216 B1 | | 1/2002 | Kim et al. |
| 6,345,185 B1 | | 2/2002 | Yoon et al. |
| 6,360,100 B1 | | 3/2002 | Grob et al. |
| 6,445,918 B1 | | 9/2002 | Hellander |
| 6,512,927 B2 | | 1/2003 | Hunzinger |
| 6,519,457 B1 | | 2/2003 | Jiang et al. |
| 6,542,744 B1 | | 4/2003 | Lin |
| 6,567,666 B2 | | 5/2003 | Czaja et al. |

(Continued)

FOREIGN PATENT DOCUMENTS

EP   1 024 606 A2   8/2000

Primary Examiner—Nick Corsaro
Assistant Examiner—Philip J. Sobutka
(74) Attorney, Agent, or Firm—Morrison & Foerster LLP

(57) ABSTRACT

A method of organizing and rescuing simultaneously failing connections in a communications system using a multiple-access forward rescue channel is disclosed. The method includes defining the multiple-access forward rescue-channel configuration using a common long-code mask and a reserved or common orthogonal channel code. Signaling on the multiple-access forward rescue channel bears MS-addressed rescue handoff messaging. The multiple-access forward rescue channel is transmitted by one or more sectors in the network for use in soft handoffs as well as rescue. A failing MS may attempt to receive a message addressed to the failing MS on the multiple-access forward rescue channel and have its connection rescued using the message information.

15 Claims, 13 Drawing Sheets

U.S. PATENT DOCUMENTS

| | | | |
|---|---|---|---|
| 6,580,919 B1 * | 6/2003 | Saito .......................... 455/522 |
| 6,606,343 B2 * | 8/2003 | Zeira et al. ................. 375/130 |
| 6,671,265 B1 | 12/2003 | Hwang et al. |
| 6,674,736 B1 | 1/2004 | Tiedemann, Jr. |
| 2001/0055969 A1 | 12/2001 | Bonta et al. |
| 2002/0034947 A1 | 3/2002 | Soliman |
| 2002/0037726 A1 | 3/2002 | Czaja et al. |
| 2002/0142776 A1 | 10/2002 | Tiedemann, Jr. |
| 2003/0002525 A1 | 1/2003 | Grilli |
| 2003/0022630 A1 * | 1/2003 | Gandhi et al. ................ 455/69 |
| 2004/0233883 A1 | 11/2004 | Ludwig et al. |

* cited by examiner

Forward Link
Pilot Channel(s)
Sync Channel
Paging Channel(s)
Traffic Channels

Reverse Link
Control Channel(s)
Access Channel
Traffic Channel(s)

| Field | Length (bits) |
|---|---|
| SIZE OF MOBILE ADDRESS | 3 |
| MOBILE COUNTRY CODE (MCC) | 10 |
| IMSI 11_12 (2 digit# based on IMSI) | 7 |
| IMSI_S (10 digit# based on IMSI) | 34 |
| USE_TIME | 1 |
| ACTION_TIME | 0 or 6 |
| SEQUENCE NUMBER | 0 or X |
| SEARCH PARAMETERS INCLUDED | 1 |
| SEARCH PARAMETERS | 0 or X |
| EXTRA PARAMETERS INCLUDED | 1 |
| EXTRA PARAMETERS | 0 or X |
| FRAME_OFFSET | 0 or 4 |
| PRIVATE_LCM | 0 or 1 |
| RESET_L2 | 0 or 1 |
| SERV_NEG_TYPE | 0 or 1 |
| POWER LEVELS | 0 or X |
| BAND_CLASS | 0 or 5 |
| CDMA_FREQ | 0 or 11 |
| RETURN_IF_HANDOFF_FAIL | 0 or 1 |
| NUM_PILOTS | 3 |

*FIG. 11*

MINIMUM INTERFERENCE MULTIPLE-ACCESS METHOD AND SYSTEM FOR CONNECTION RESCUE

CROSS-REFERENCE TO RELATED APPLICATIONS

Embodiments of the present invention claim priority from U.S. provisional patent application Ser. No. 60/251,670 entitled "Minimum Interference Multiple-Access Method for CDMA Rescue Channels," filed Dec. 5, 2000, and are related to U.S. application Ser. No. 09/978,974 entitled "Forward Link Based Rescue Channel Method and Apparatus for Telecommunication Systems," filed Oct. 16, 2001, the contents of which are incorporated herein by reference for all purposes.

BACKGROUND OF THE INVENTION

1. Field of the Invention

The present invention relates, generally, to communication network management and, in one embodiment, to methods and apparatus for providing a multiple-access scheme for forward-link rescue channels.

2. Description of Related Art

Introduction

Rather than just providing a means for emergency communications, cellular telephones are rapidly becoming a primary form of communication in today's society. As cellular telephone usage becomes widespread, cellular telephone networks are becoming increasingly prevalent and are providing coverage over larger areas to meet consumer demand. FIG. 1 depicts an example of a mobile station (MS) 10 operated by a mobile user that roves through a geographic area served by a wireless infrastructure or network including a first base station (BS) 12 with wireless sectors A 14 and sector B 16, and a second BS 18, with a sector C 20. In the course of such roving, MS 10 travels from position A to position B to position C and will, as a matter of course, experience variations in signal strength and signal quality of the forward link associated with the BS(s) that it is in contact with. Signal strength and quality can be especially undependable near the edges of the sectors, such as when the MS 10 transitions from the area defined by the dotted line of Sector A 14 to the area defined by the dotted line of Sector B 16, or from Sector B 16 to Sector C 20. It is in these transition areas, as well as other areas of weak signal strength or quality, where dropped connections are likely to occur. A connection as referred to herein includes, but is not limited to, voice, multimedia video or audio streaming, packet switched data and circuit switched data connections, short message sequences or data bursts, and paging.

Dropped connections can range from being a nuisance to devastating for cellular telephone users. For example, a dropped emergency 911 connection can be critical or even fatal. Dropped connections can create consumer frustration significant enough to cause the consumer to change service providers. Thus, the prevention of dropped connections is of major importance to cellular network providers.

Cellular Telephone Networks

FIG. 2 illustrates an exemplary communication link 22 between a MS 24 and a BS 26. Communications from the BS 26 to the MS 24 are called the forward link, and communications from the MS 24 to the BS 26 are called the reverse link. A BS 26 is typically comprised of multiple sectors, usually three. Each sector includes a separate transmitter and antenna (transceiver) pointed in a different direction. Because the term BS is often used to generally identify a transceiver, it should be understood that the terms BS and sector are used herein somewhat interchangeably. The forward and reverse links utilize a number of forward and reverse channels. For example, the BS 26 communicates with the MSs using a plurality of forward common channels or links which may include, but are not limited to, one or more pilot channels, a sync channel, and one or more paging channels, discussed in greater detail below. These channels are referred to as common channels because the BS 26 may communicate those channels to all MSs in the network. Generally, these common channels are not used to carry data, but are used to broadcast and deliver common information.

Each sector within BS 26 broadcasts a pilot channel that identifies that sector and is simple for a MS 24 to decode. Both sectors and pilot channels are distinguished by pseudonoise (PN) offsets. The word "pilot" can be used almost interchangeably with the term sector, because a pilot channel identifies a sector. The pilot channel implicitly provides timing information to the MS, and is also used for coherent demodulation, but it otherwise typically does not contain any data. When a MS is first powered up, it begins searching for a pilot channel. When a MS acquires (is able to demodulate) a pilot channel, the timing information implicit in the pilot channel allows the MS to quickly and easily demodulate a sync channel being transmitted by the network.

Because the sync channel contains more detailed timing information, once the MS acquires the sync channel, the MS is then able to acquire a paging channel being transmitted by the same BS that is transmitting the pilot channel. That BS is known as the active BS. When a cellular network is attempting to initiate communications with a MS through a particular BS, a "page" is transmitted to that MS on the paging channel of that BS. Thus, once the MS is able to demodulate the paging channel of a particular BS, the MS may then monitor that paging channel while the MS is idle and waiting for incoming connections or an incoming message. In general, each BS may utilize one pilot channel, one sync channel and one paging channel that are common for all MSs to receive. However, because there are practical limitations the number of MSs that can be simultaneously paged using one paging channel, some BSs may employ multiple paging channels.

In addition to the forward common channels described above, the BS 26 communicates with individual MSs using a plurality of forward dedicated channels or links which may include, but are not limited to, multiple traffic channels, multiple supplemental channels, and multiple access channels. These channels are referred to as dedicated channels because the BS communicates the channels to a specific MS 24, and the channels may carry data.

The reverse channels or links may include an access channel and one or more reverse traffic channels. After a MS receives an incoming page from a BS, the MS will initiate a connection setup using, in part, an access channel.

The previously described channels may employ different coding schemes. In time division multiple access (TDMA), multiple channels may be communicated at a particular frequency within a certain time window by sending them at different times within that window. Thus, for example, channel X may use one set of time slots while channel Y may use a different set of time slots. In frequency division multiple access (FDMA), multiple channels may be communicated at a particular time within a certain frequency window by sending them at different frequencies within that window. In code division multiple access (CDMA), given a space of frequency and time, each channel is assigned various frequencies at various times, according to a particular orthogonal code such as a Walsh code or a quasi-orthogonal function (QOF). The code will define how a particular channel changes over frequency and time. In direct sequence CDMA, the data from each channel is coded using Walsh codes or QOFs and then combined into a composite signal. This composite signal is spread over a wide frequency range at a particular time. When this composite signal is decoded using the same code used to code the original data, the original data may be extracted. This recovery of the original data is possible because Walsh codes and QOFs create coded data that, when combined, don't interfere with each other, so that the data can be separated out at a later point in time to recover the information on the various channels. In other words, when two coded sequences of data are added together to produce a third sequence, by correlating that third sequence with the original codes, the original sequences can be recovered. When demodulating with a particular code, knowledge of the other codes is not necessary. However, noise and interference in the field may require error correction to determine what was actually transmitted. The CDMA wireless communication system is fully described by the following standards, all or which are published by the TELECOMMUNICATIONS INDUSTRY ASSOCIATION, Standards & Technology Department, 2500 Wilson Blvd., Arlington, Va. 22201, and all of which are herein incorporated by reference: TIA/EIA-95B, published Feb. 1, 1999; and TIA/EIA/IS-2000, Volumes 1–5, Release A, published Mar. 1, 2000.

As described above with reference to an example CDMA system, orthogonal codes may be used to code a particular channel. For example, the simple-to-decode pilot channel described above may use a fixed, known code such as the all one coded $W_0$ Walsh code. Similarly, the sync channel may use the alternating polarity $W_{32}$ Walsh code. In addition to the orthogonal codes used to define channels such as traffic channels, for example, privacy scrambling may also be added such that a MS can only read the data on the traffic channel that it can unscramble. This privacy scrambling may be accomplished by the use of a mask in conjunction with the orthogonal code.

Each MS groups the channels into various sets, which may include, but is not limited to, an active set, a neighbor set, a candidate set, and a remaining set, discussed in further detail below.

The MS active set contains the pilots or PN offset identifiers that a MS is utilizing at any point in time. Thus, when a MS is idle, but monitoring a single BS for pages and overhead updates, the active set for that MS will contain that BS pilot or PN offset identifier as its only member.

There may be instances, however, when a MS is being handed off from one BS or sector to another, and during this handoff may actually be in communication with multiple BSs or sectors at the same time. When this occurs, multiple active pilots will be in the active set at the same time. For example, in a "soft handoff," a MS in communication with BS "A" will begin to communicate with a BS "B" without first dropping BS "A," and as a result both BS "A" and "B" will be in the active set. In a "softer handoff," a MS in communication with sector "A" in BS "A" will begin to communicate with a sector "B" in BS "A" without first dropping sector "A," and as a result both sector "A" and "B" will be in the active set. In a "hard hand-off," however, a MS in communication with BS "A" will begin to communicate with a BS "B" only after first dropping BS "A," and as a result either BS "A" or "B" will be in the active set at any one time, but not both.

During the time in which the MS is in communication with multiple BSs, the MS assigns rake receiver fingers to multiple channels from one or more sectors at the same time. When a MS is in communication with multiple BSs at the same time, the MS should be receiving the same data from both of those BSs. However, although the data may be the same, it may be communicated differently from different BSs because the channels may be different. The rake receiver will therefore receive encoded data from different sectors on different channels, demodulate those sectors independently, and then combine the data. When the data is combined, the data from a strong channel may be weighted more heavily than data from a weak channel, which is likely to have more errors. Thus, the data with a higher likelihood of being correct is given higher weight in generating the final result.

When a MS is idle, a neighbor set which includes BSs that are neighbors to the active BS is received by the MS on a common channel. However, when a MS is active and communicating with a BS through a traffic channel, the neighbor set is updated on a traffic channel.

Any other BSs in the network that are not in the active, neighbor, or candidate sets (discussed below) comprise the remaining set. As illustrated in FIG. 3, whether a MS is idle or active, the network repeatedly sends overhead messages 30, 32 and 34 to the MS. These overhead messages contain information about the configuration of the network. For example, the extended neighbor list overhead message 34 tells the MS what neighbors exist and where to look for them. These neighbor identifiers are stored, at least temporarily, within the memory of the MS.

The candidate set is a set of BSs that the MS has requested as part of its active set, but have not yet been promoted to the active set. These candidate BSs have not yet been promoted because the network has not sent a hand-off direction message (HDM) to the MS in reply to the message from the MS, directing that MS change its active set to include these BSs. Typically, the exchange of such messages occurs as part of the handoff process, described below.

FIG. 4 depicts a generic structure of a wireless infrastructure 56. A client MS 36 continually monitors the strength of pilot channels it is receiving from neighboring BSs, such as BS 38, and searches for a pilot that is sufficiently stronger than a "pilot add threshold value." The neighboring pilot channel information, known in the art as a Neighbor Set, may be communicated to the MS through network infrastructure entities including BS controllers (BSC) 40 that may control a cell cluster 42, or a mobile switching center (MSC) 44. It should be understood that the MS and one or more of these network infrastructure entities contain one or more processors for controlling the functionality of the MS and the network. The processors include memory and other peripheral devices well understood by those skilled in the art. As the MS 36 moves from the region covered by one BS 38 to another, the MS 36 promotes certain pilots from the Neighbor Set to the Candidate Set, and notifies the BS 38 or BSs of the promotion of certain pilots from the Neighbor Set to the Candidate Set via a Pilot Strength Measurement Message (PSMM). The PSMM also contains information on the strength of the received pilot signals. The BS 38 determines a BS or network Active Set according to the Pilot Strength Measurement Message, and may notify the MS 36 of the new Active Set via an HDM. It should be noted, however, that the new active set may not always exactly comply with the MS's request, because the network may have BS resource considerations to deal with.

The MS 36 may maintain communication with both the old BS 38 and the new BS so long as the pilots for each BS are stronger than a "pilot drop threshold value." When one of the pilots weakens to less than the pilot drop threshold value, the MS 36 notifies the BSs of the change. The BSs may then determine a new Active Set, and notify the MS 36 of that new Active Set. Upon notification by the BSs, the MS 36 then demotes the weakened pilot to the Neighbor Set. This is one example of a handoff scenario. It is typical for a MS 36 to be starting a handoff or in the process of handoff when connections fail. This is expected because poor coverage or weak signal environments generally exist near cell boundaries, in areas of pilot pollution, or areas significantly affected by cell breathing, capacity limitations, network resource availability, and network coverage, all which are well known in the art.

Dropped Connections

A dropped connection may manifest in a number of ways. FIG. 5 shows a situation known in the art as a Layer 2 Acknowledgment Failure for a CDMA wireless network. In the example of FIG. 5, the MS is transmitting a PSMM 48 requiring an acknowledgment by the BS. The BS may be receiving it correctly, but in the case shown in FIG. 5, the MS is not receiving the BS's acknowledgment (ACK) 46. The MS will retransmit the message $N_{1m}$ (=9) times in accordance with a retransmission counter and then terminate (drop) the connection. It is common for this type of failure to occur when the message that the Layer 2 Acknowledgment Failure occurs for is a PSMM 48 which includes a request for a pilot that is needed by the MS to maintain the connection.

FIG. 6 shows a second situation for which recovery is possible using the current invention in a CDMA wireless network. This situation is known in the art as a Forward Link Fade Failure. A fade is a period of attenuation of the received signal power. In this situation, the MS receives $N_{2m}$(=12) consecutive bad frames 50, the response to which is to disable its transmitter 52. If it is then unable to receive $N_{3m}$ (=2) consecutive good frames before a fade timer expires after $T_{5m}$ (=5) seconds, the MS drops the connection 54. It is common for this type of failure to occur during the time that a MS promotes a pilot to the candidate set and needs to send a PSMM, or after a MS has sent a PSMM but before receiving a handoff direction message.

Layer 2 Acknowledgment Failures and Forward Link Fade Failures may occur because of excessively high frame error rates or bursty error rates. As illustrated in FIG. 7, a channel 58 may be broken up into slots 60, or superframes, typically of 80 millisecond duration. Each slot may be divided into three phases 62. These phases are numbered: 0, 1 and 2. Overlapping on top of the phases are four frames 64. These four frames are aligned with the three phases at the superframe boundaries. Each frame 64 is therefore typically 20 milliseconds long. Within each frame 64 is a header area 66, some signaling information 68 and perhaps some data 70. It should be understood that the content of the frames 64 can differ. One frame may contain signaling and data, another may contain only signaling, and yet another may contain only data. Each frame 64 may also have a different data rate, which can be changed on a frame-by-frame basis.

In some example communication standards, there are four rates: full, one-half, one-fourth and one-eighth. Thus, for example, with no voice activity, information may be transmitted at a one-eighth frame rate, which would be beneficial because less power or bandwidth is required to communicate information at a slower rate.

In a practical communications network, it is neither realistic nor desirable to target an error rate of zero percent (i.e., all frames received properly). Rather, a frame error rate of one percent, for example, is targeted. Power control loops actually control this frame error rate. In this example, if the frame error rate rises above one percent, then the power control loop might increase the power of signals transmitted by the MS so that the frame error rate decreases to approximately one percent. On the other hand, if the frame error rate is less than one percent, the power control loop may reduce transmitted power to save power and allow the frame error rate to move up to one percent. The BS may therefore continuously instruct the MS, through power control bits in a configuration message, to transmit at various power levels to maintain an error rate of approximately one percent as the MS moves around in a particular area, or other types of interferences begin or end. The MS typically abides by the power levels that are being recommended to it by the BS. In addition, the BS can also change its transmitter power for a particular channel. Thus, both the BS and the MS may continuously provide each other feedback in order to change the other's power levels. However, the BS may not necessarily change its transmitter power levels based on the feedback from the MS.

Despite the aforementioned power control loop, error rates may not be controllable to about one percent as a MS moves about in a cellular network and experiences variations in signal strength and signal quality due to physical impediments, interference from adjacent channels, and positions near the edges of sectors, and as the error rates rise to intolerable levels, dropped connections become a problem.

Rescue Procedures

Rescue procedures based on the reverse link or restarting the connection have previously been proposed. Generally, a rescue of a failing connection is possible if there is a sector (pilot) that would be capable of sustaining the connection if the failing MS had that pilot in its Active set. Rescue procedures attempt to add these missing pilots to the MS and network Active sets. Essentially, the MS adds pilots autonomously to its Active set and, in the case of reverse-link initiated rescues, transmits on a reverse rescue channel that is typically reserved (dedicated) and pre-arranged in advance. The network transmits on a forward rescue channel, also pre-arranged in advance so that the MS is able to detect such transmission. Typically, a channel assignment or handoff message may be used to complete the rescue by formally assigning the MS to a new Active set that is synchronized with the network's Active set.

Reverse-link-based rescue methodologies include common and dedicated channel methods. In a typical reverse based rescue procedure, the MS transmits a rescue channel, either on a common or dedicated channel, while the communications network utilizes one or more sectors in an attempt to demodulate the rescue channel. Previously proposed reverse-based rescue procedures were activated only during a forward fade condition, and are deficient because the MS transmits before the BS, which is less efficient, and because they do not support simultaneous rescue of multiple failing connections. Furthermore, proposed reverse-link rescue procedures based on restarting the connection utilize the same high-power and time consuming random access channel as connection originations, and is essentially a re-origination of the connection. Such reverse-link rescue procedures create capacity problems, introduce interference because the MS is probing, and are not compatible with a dedicated channel rescue.

To overcome the deficiencies presented by reverse-based rescue procedures, forward based rescue procedures have been proposed. One such forward based rescue procedure is disclosed in U.S. application Ser. No. 09/978,974 entitled "Forward Link Based Rescue Channel Method and Apparatus for Telecommunication Systems," filed Oct. 16, 2001, which describes methods and apparatus for preventing loss of signal and dropped connections between a MS and the infrastructure in a telecommunications network. A connection as referred to herein includes, but is not limited to, voice, multimedia video and audio streaming, packet switched data and circuit switched data connections, short message sequences or data bursts, and paging. The procedure, which will be generally referred to herein as the Forward Rescue Procedure (FRP), allows systems to recover from failures at the MS or BS that would otherwise result in dropped connections. Examples of failure scenarios that can be overcome using the FRP include forward link Layer 2 (L2) acknowledgement failures and loss of forward link signal due to a fade that causes loss of signal for a period of time exceeding a threshold value. In response to a potential connection drop situation, a MS will autonomously add BS pilot channels to the active set of its rake receiver in order to rescue the connection in danger of dropping. Concurrently, the network infrastructure will initiate transmission on alternative forward link channels that are likely to be monitored by the MS during an FRP. If the same channels are monitored by the MS and transmitted on by the infrastructure, the connection in danger of dropping can be rescued.

The general FRP includes a MS FRP, and may also include an infrastructure FRP. FIG. 8 illustrates an example of the timeline of the MS FRP and infrastructure FRP in a typical connection rescue. As mentioned above, although the MS FRP is central to any rescue, the infrastructure FRP, although recommended, is not strictly necessary.

Triggering of the MS FRP depends upon the type of failure that occurs. In the case of a Layer 2 failure, the FRP is activated upon a number of failed retransmissions of a message requiring acknowledgments. In the case of a Forward Link Fade Failure, the FRP is activated if there exists a loss of signal for a period of time exceeding a threshold value (see reference character 72).

The MS starts an FRP timer at the time the rescue attempt is started (see reference character 74). If the FRP timer expires before the rescue is complete, then the connection is dropped. In addition, at the time the rescue attempt is started, the MS turns off its transmitter and selects a new active set (see reference character 74). In this embodiment, the MS effectively assumes a handoff direction based on the PSMM (s) that it has sent (whether or not the PSMM was actually sent, successfully sent, or acknowledged). In other words, the MS promotes pilots to the Active set autonomously without a handoff direction (i.e. the new active set is the union of the old active set and the autonomously promoted active pilots: S"=S U S') (see reference character 76). The MS then begins to cycle through this new Active set searching for a rescue channel. As noted above, although the term rescue channel encompasses the various schemes for defining channels as utilized by the various communication protocols, for purposes of simplifying the disclosure, a rescue channel will herein be identified as an Assumed Code Channel (ACC) (see reference character 78).

As noted above, the infrastructure FRP, although recommended, is not strictly necessary for every BS in the network. If the infrastructure FRP is implemented (see reference character 80), the infrastructure (network) selects sectors from which it will transmit the ACC.

In one embodiment of the FRP, null (blank) data is transmitted over the ACC during rescue. In other embodiments, data may be communicated over the ACC, although a MS would only hear this data if it actually finds and successfully demodulates that ACC.

At some point in time, the MS will find and demodulate $N_{3M}$ good frames of the ACC (see reference character 82), turn on its transmitter, and begins to transmit back to the BS. Once both the MS and BS receive a predetermined number of good frames, the rescue is completed (see reference character 84) and the BS may re-assign the MS to more permanent channels. Additionally, the network may re-assign the ACCs via overheads, for example. The BSs may also re-assign the MS active set to clean up after the rescue by sending a Rescue Completion Handoff message 86 which can re-use any existing handoff messages such as General or Universal Handoff Direction messages. For additional detail on the forward based rescue procedure, see U.S. application Ser. No. 09/978,974 entitled "Forward Link Based Rescue Channel Method and Apparatus for Telecommunication Systems," filed Oct. 16, 2001.

Rescue transmissions generally require that a channel be either reserved or otherwise available. Without loss of generality, one or more codes or other channel identifiers such as orthogonal codes (e.g. Walsh codes or QOFs) are typically reserved or allocated to define rescue channels for the forward-link response from the network. Typically, no additional code is required for the reverse link, because the MS uses its long code mask for unique identification.

There are several complications that currently render efficient rescue problematic. One complicating issue is that of synchronization of the Active set. If the MS and network Active sets are not synchronized during rescue, MS demodulation may be heavily degraded. Another closely related complicating issue is that of rescue channel contention. In a heavily loaded network, which is the target operating point for efficiency, more than one MS may drop a connection, and subsequent rescue processes can overlap. In this instance, there is a high probability of contention for the forward-link rescue channel(s), because of the limited number of dedicated rescue channels. This is generally true even if there are many forward rescue channels reserved, because effective assignment of particular rescue channels to the failing MSs is complicated by the unpredictability of dropped or failed connections. The rescue channel contention issue exists because dropped connections are inherently difficult to predict, and therefore a network cannot reliably assigned different rescue channels to MSs before they drop. If such as assignment were possible, then simultaneous rescues of MSs could occur independently on different channels without contention. Yet another complicating issue that plagues rescues is that MS attempts at demodulation of rescue channels may be severely impacted by interference.

Therefore, what is desired is a rescue methodology that enables synchronization of Active sets, minimizes rescue channel contention, and minimizes interference caused by MS demodulation of rescue channels.

SUMMARY OF THE INVENTION

Communications systems often suffer from failing or dropped connections, including voice and data connections, that are recoverable. Current connection rescue methods are limited by the unpredictability of those drops and therefore have negative impacts on MS interference and soft-handoff capability, and generally do not gracefully handle simultaneous recovery of drops that occur within a short period of time of each other. Unfortunately, there is a relatively high probability of connections dropping within some short period of time from each other because of cell-breathing and radio frequency resource utilization.

Embodiments of the present invention include a method of rescuing failing connections in communications system, and provide a means to overcome the above-described complications with a single technique. The technique includes a multiple-access forward rescue-channel configuration using a common long-code mask, a reserved or common orthogonal channel code, and new signaling on the forward rescue channel to bear new MS-addressed rescue handoff messaging. The forward-initiated common rescue channel minimizes MS interference and organizes the rescue of simultaneous failures. Because the network cannot reliably assign different rescue channels to MSs before they drop, embodiments of the present invention mitigate this problem with a single common rescue channel available to any MS in need of rescue. Interference is minimized by optionally using a forward-initiated procedure and organizing the rescue of simultaneous failures. Multiple access is provided by using a common long-code mask, new signaling, new MS-addressed rescue handoff messaging, and one forward rescue channel independent of the number of failures.

In embodiments of the present invention, a forward common channel defined by codes is transmitted by one or more sectors in the network for use in soft handoffs as well as rescue. Within the forward common channel are messages addressed to failing MSs, comprising a MS identification and handoff information. A failing MS may attempt to receive a message addressed to the failing MS on the forward common channel and have its connection rescued using the message information.

These and other features and advantages of embodiments of the present invention will be apparent to those skilled in the art from the following detailed description of embodiments of the invention, when read with the drawings and appended claims.

BRIEF DESCRIPTION OF THE DRAWINGS

FIG. 11 is an example format of a rescue channel multiple-access synchronization message according to an embodiment of the present invention.

DETAILED DESCRIPTION OF PREFERRED EMBODIMENTS

Figure 1:
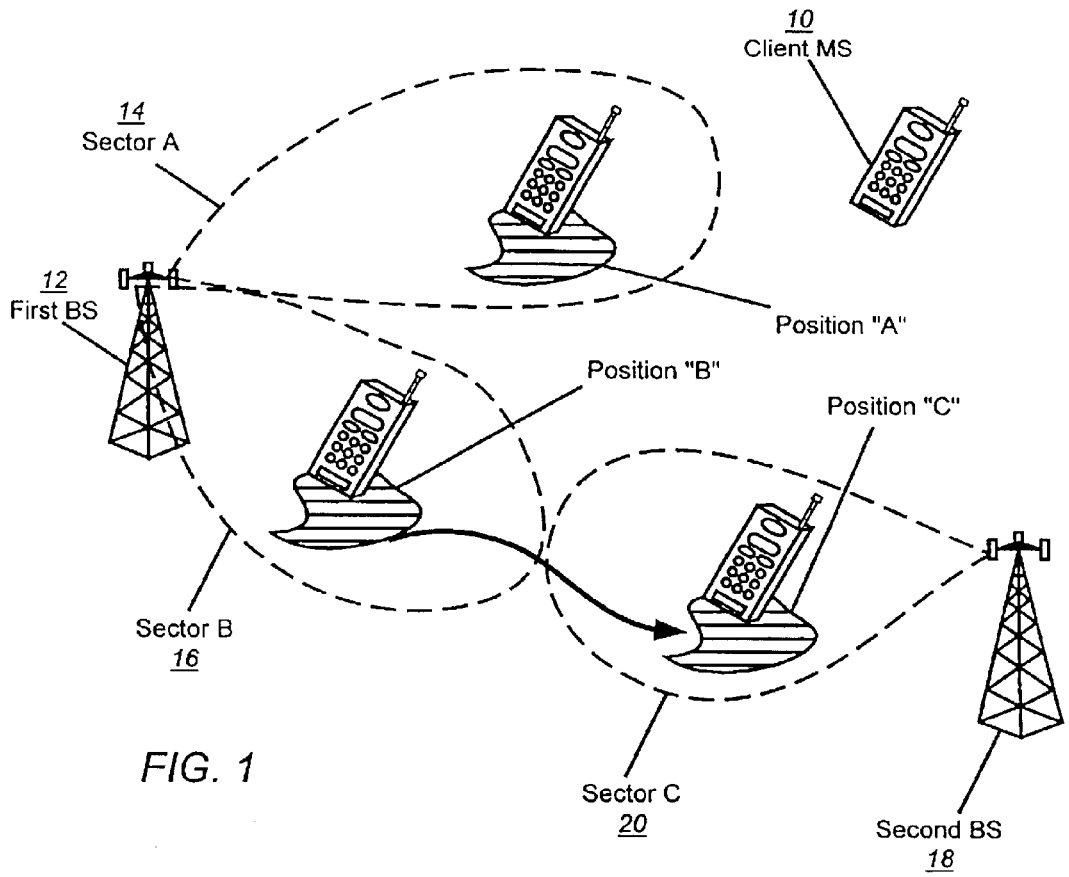
FIG. 1 illustrates a roving mobile station moving amongst different locations between sectors in a wireless communication system.
Figure 2:
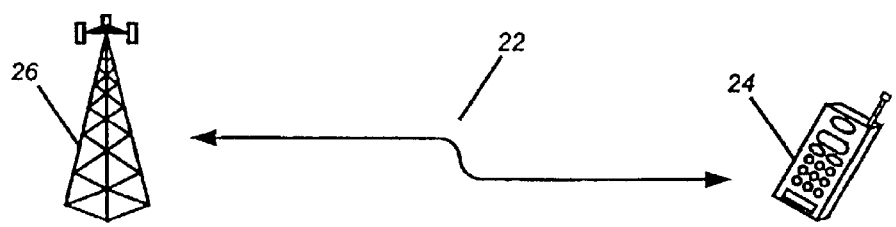
FIG. 2 illustrates an exemplary communication link between a mobile station and a base station in a wireless communication system.
Figure 3:
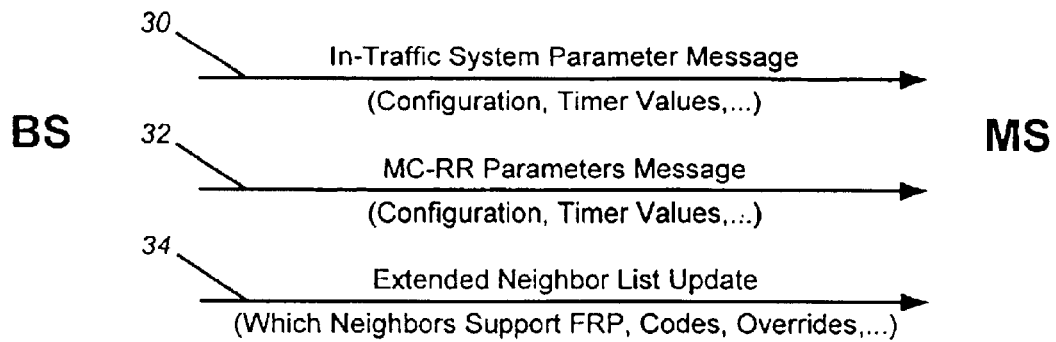
FIG. 3 illustrates overhead messages communicated from a base station to a mobile station in a wireless communication system.
Figure 5:
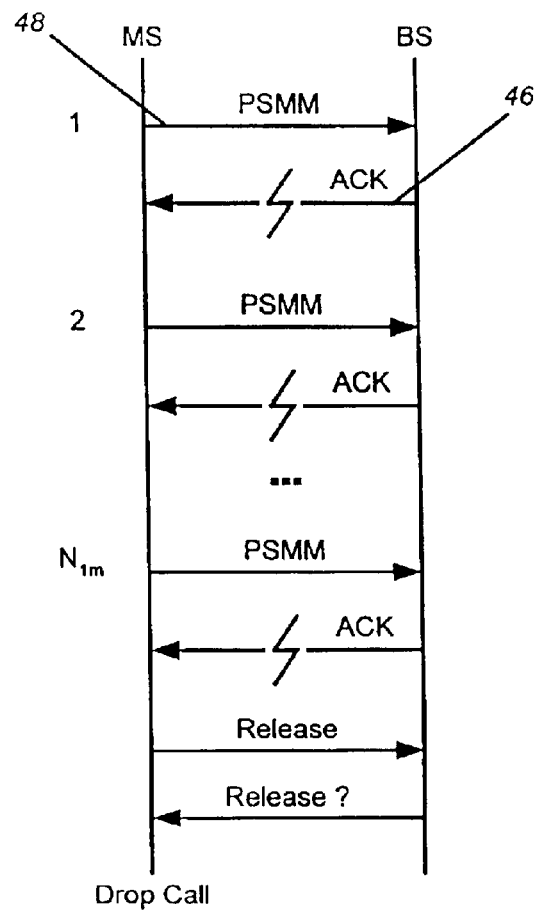
FIG. 5 is a message sequence between a mobile station and a base station resulting in a dropped connection due to Layer 2 Acknowledgement failure.
Figure 4:
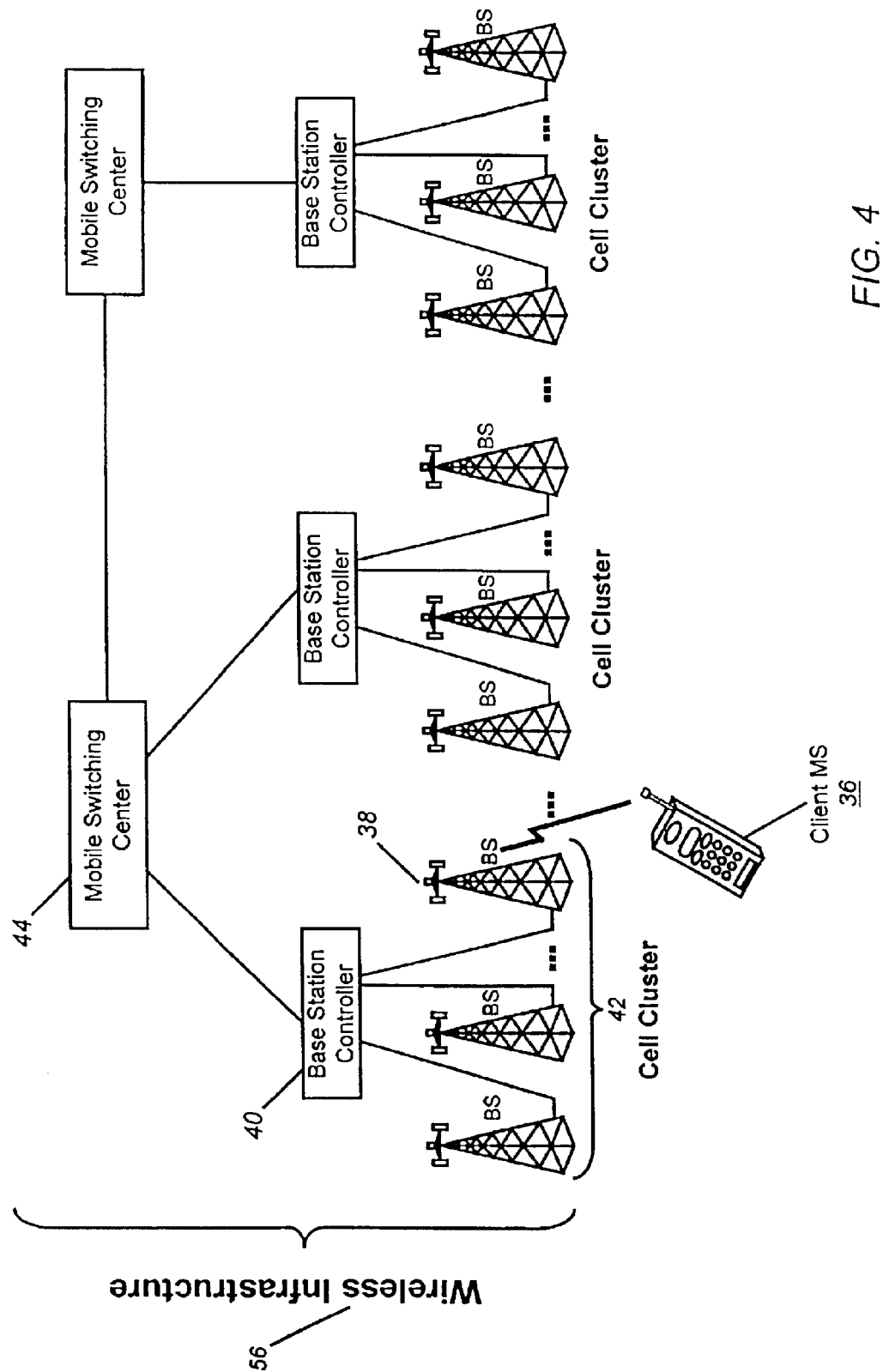
FIG. 4 illustrates a wireless communication infrastructure in communication with a roving mobile station.
Figure 6:
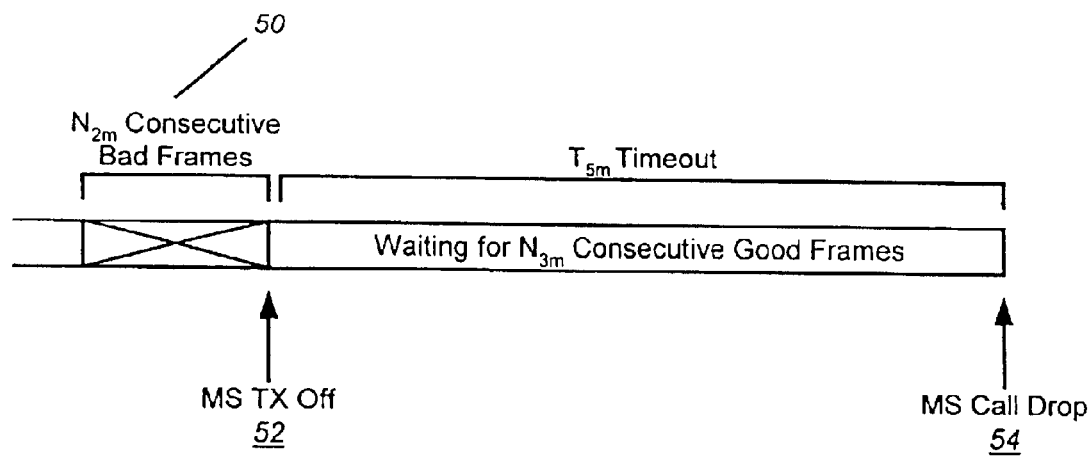
FIG. 6 is a timeline that is representative of a dropped connection resulting from fading of the forward link in a wireless telecommunications network.
Figure 7:
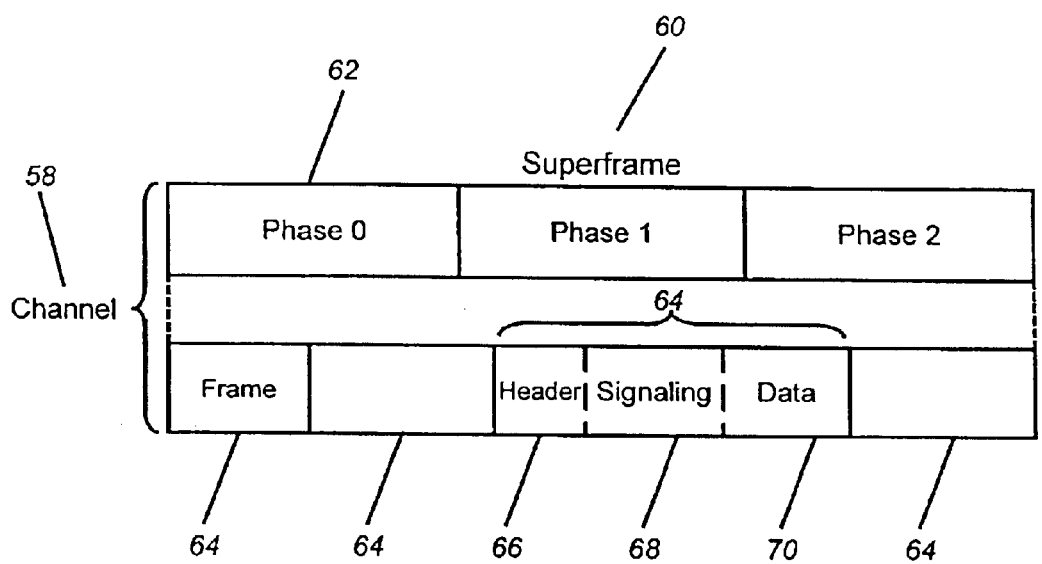
FIG. 7 is a timeline of a superframe, divided into three phases and four frames, for use in a wireless telecommunications network.
Figure 8:
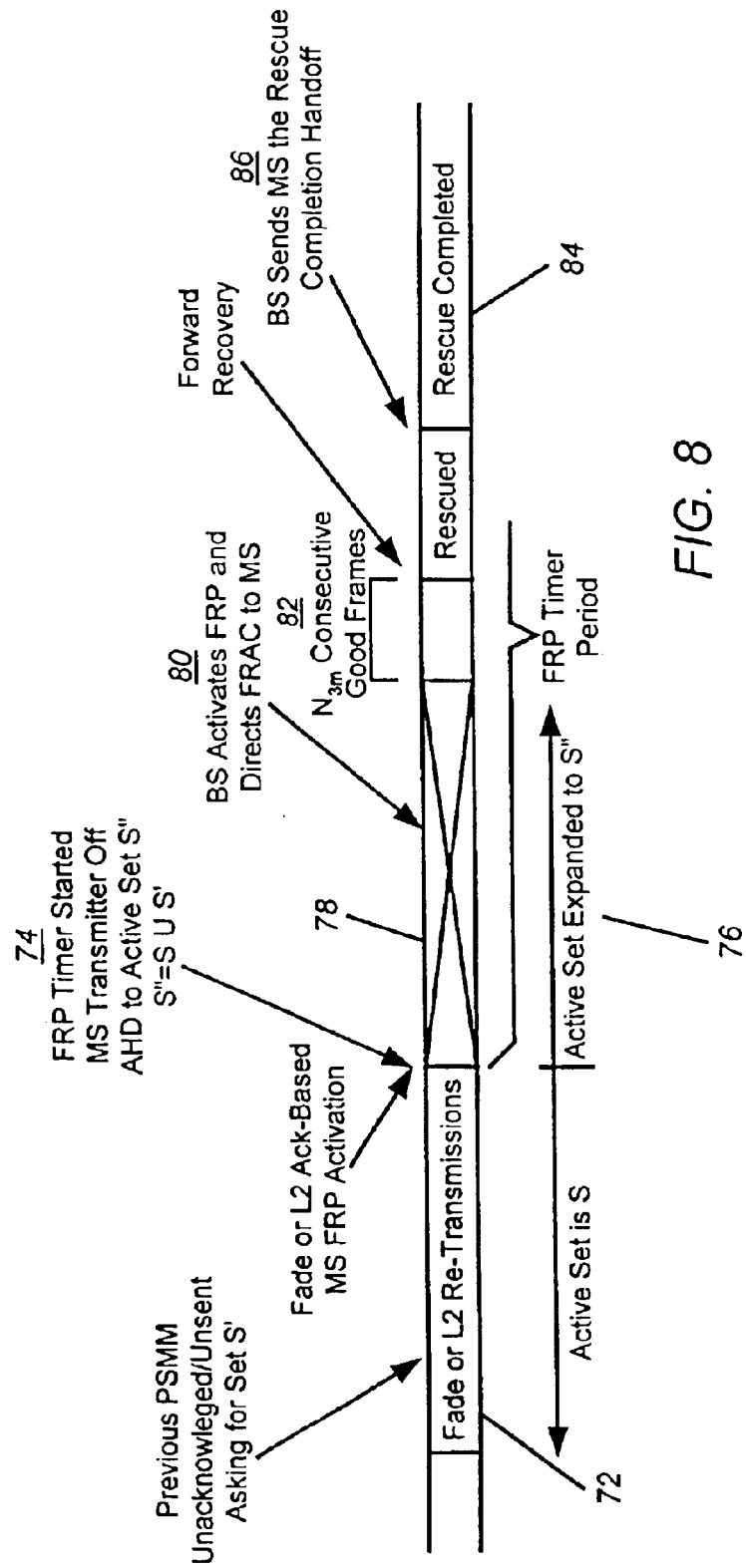
FIG. 8 is a timeline of one embodiment of the Forward Rescue Procedure when it is activated.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

It should be further understood that although the description provided herein may reference the CDMA communication protocol (code-based protocols) for purposes of explanation only, embodiments of the present invention are applicable to other communication protocols and digital radio technologies generally, and include, but are not limited to, CDMA, TDMA, FDMA, GSM, GPRS, and the like. Furthermore, although the description provided herein focuses mainly on a forward common channel for reverse-based rescue purposes, embodiments of the present invention are applicable to forward-based rescue procedures and other uses of a forward common channel, such as for transmission of data encrypted for a specific MS, soft handoffs, and the like.

As described above, a typical forward link includes multiple common channels. In embodiments of the present invention, the forward link also includes a forward common multiple access rescue channel (RC-MA) defined by a rescue channel orthogonal code (RC-OC). The RC-MA allows multiple failing MSs to access the RC-MA and rescue their failing connections. In addition to the orthogonal code used to define the RC-MA, privacy scrambling using a long code mask may also be added such that only those MSs with knowledge of the long code mask can access the RC-MA. The RC-MA can be received in soft handoff by multiple MSs.

In an embodiment of the present invention utilizing a reverse-based rescue procedure for purposes of illustration only, when a MS first detects a potentially failing connection, it begins to transmit a reverse rescue channel to the network. The network responds by communicating a message specific to that failing MS within the RC-MA, and if the failing MS is able to receive that message, the failing connection can be rescued. The reverse rescue channel and the RC-MA will be discussed in greater detail below.

Reverse Link Rescue Channel Transmission

As described above, in embodiments of the present invention utilizing a reverse-based rescue procedure, after a MS first detects a potentially failing connection and turns off its transmitter, it begins to transmit a reverse rescue channel to the network. MS reverse-link rescue channel transmissions use the MS's public or private long code mask presently in use for the current connection (explained in further detail below), because the MS's unique public or private long code is used for channelization on the reverse link. Private long codes can be computed using an encryption algorithm, while public long codes may be predetermined or transmitted to the MS by the network in advance of the detection of the potentially failing connection. It should be noted that the long code is also used for spreading on other reverse CDMA channels, such as the reverse traffic channel, the access channel, the enhanced access channel, and the reverse common control channel.

Forward Link RC-MA Transmission

Figure 9:
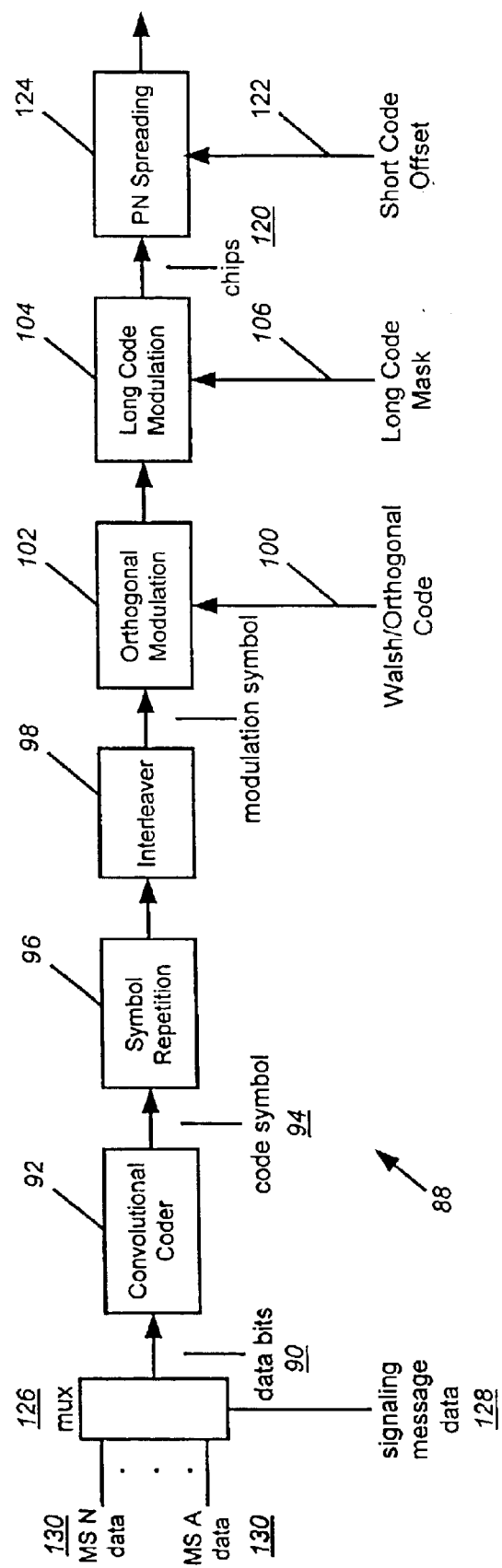
FIG. 9 is a block diagram of a forward channel transmitter implemented in a BS transceiver that may be configured for communicating a signaling message on a multiple-access rescue channel according to an embodiment of the present invention.

Continuing the above example for purposes of illustration only, once the network recognizes that the MS is failing, the network watches for a reverse rescue transmission from the failing MS. After the network receives a reverse rescue channel from a MS having a potentially failing connection, the network responds by communicating a RC-MA containing a message specific to that failing MS. FIG. 9 is a block diagram of a forward channel transmitter 88 implemented in a BS transceiver that may be configured for communicating data on a forward traffic channel, for example, or a signaling message on the RC-MA according to an embodiment of the present invention. In FIG. 9, data bits or signaling information 90 is fed into a convolutional coder 92 that outputs code symbols 94. These code symbols 94 are input to symbol repetition block 96. The output of symbol repetition block 96 is then interleaved using interleaver 98.

Walsh or other orthogonal or QOF codes 100 are then used in orthogonal modulation 102, which channelizes the data. The network has a fixed orthogonal code space (a fixed number of orthogonal codes) available for use in channelization. A large portion of the orthogonal code space may be used for a high data rate channel (because the shorter the code, the bigger the bandwidth), or a smaller portion of the orthogonal code space could be used for a lower data rate channel. If the RC-MA is being transmitted, the RC-OC assigned to the RC-MA is applied. The RC-OC must also be allocated from the orthogonal code space.

The transmitter 88 then performs long-code modulation 104 with an applied long code mask 106 for privacy scrambling. In general, the long code mask 106 is combined with a long code within the long code modulation block 104 to create the unique identity of the long code. There are several types of long code masks 106. A predetermined public long code mask is a unique mask that is applied to the long code modulation block 104 to generate a known public long code unique to each MS that may be used for initiating a connection. The public long code mask is essentially a permutation of the bits of the MS's ESN.

If the RC-MA is being transmitted, a rescue channel long-code mask (RC-LCM) assigned to the RC-MA is applied to the long code modulation block 104. The long code modulation block 104 provides coding for the RC-MA using a masked long code that only MSs knowing that long code mask can demodulate. In embodiments of the present invention, the network and all MSs in the network in need of rescue using that RC-MA would know that RC-MA long code mask. Private long codes can be generated by any number of methods, such as by using a lookup table or a linear feedback shift register (LFSR) and applying the RC-LCM of the same length as the public long code to the public long code. For example, if the public long code is a 42-bit binary number, the RC-LCM would be the same length.

Figure 10:
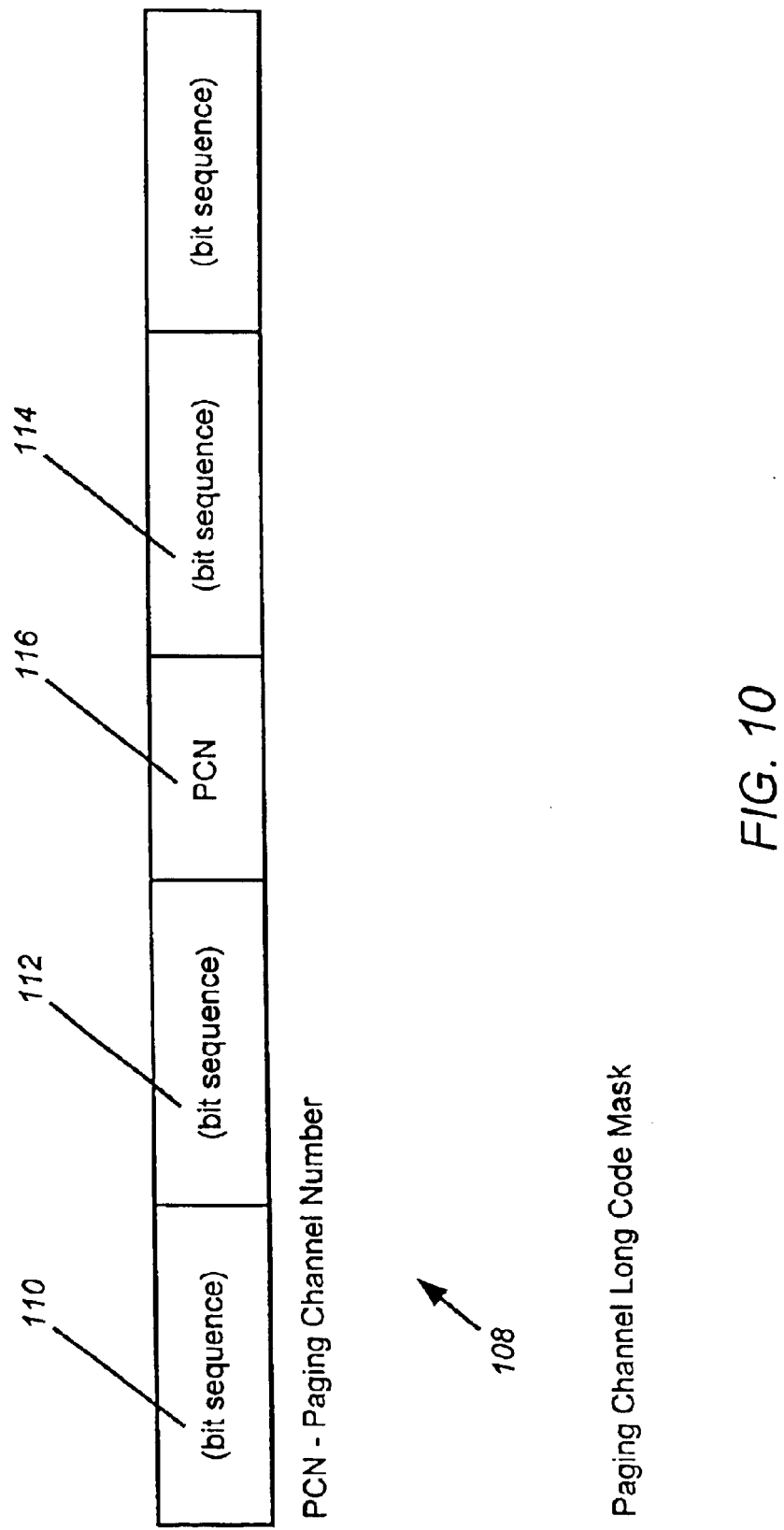
FIG. 10 shows the format of a paging channel long code mask.

FIG. 10 shows the format of a paging channel long code mask 108, and is presented as an example illustration of what the format of the RC-LCM could look like. The RC-LCM may be divided into blocks containing predetermined bit sequences (similar to those identified by reference characters 110, 112, and 114 in FIG. 10), and a rescue channel number (RCN) (similar to the paging channel number (PCN) 116 shown in FIG. 10). Any MS that knows the RCN would therefore be able to generate the RC-LCM and receive the RC-MA. It should be understood that other known parameters may also be used to generate the RC-LCM. However, because the RC-LCM is common throughout the entire network or at least a region of a network, the parameters that make up the RC-LCM cannot be BS or MS identifiers, but rather, parameters that are common throughout the network or common to a part of the network such as areas defined by a system identifier (SID) or network identifier (NID).

Referring again to FIG. 9, the chip output 120 is then spread 124 with a short code 122 that is offset uniquely to identify the particular sector that is transmitting the channel (i.e., using a pilot PN sequence offset index for the forward CDMA channel (PILOT_PN)). Note the sequence of the spreading, in particular the long code modulation block 104.

The RC-MA may be transmitted from one or more sectors in the network, and can be demodulated by any MS. This is possible because all MSs know the RC-LCM and the RC-OC assigned to the RC-MA. The RC-MA may be transmitted continuously to support rescues of multiple MSs much like a common broadcast channel, except that the RC-MA can be gated off when no rescues are in progress.

Another component of the multiple-access scheme according to embodiments of the present invention is that the RC-MA bears a new signaling message identified herein as a rescue channel multiple-access synchronization (RC-MAS) message, which identifies which MS the network is attempting to rescue. The RC-MAS message includes a MS identification (or address) and rescue handoff information. This MS address may be in the form of an ESN, IMSI (International Mobile Station Identifier), or another parameter identifying the MS.

The RC-MA also bears a new signaling message identified herein as a rescue handoff (RC-HO) message. A RC-HO message includes the new Active set for the MS after rescue, with code channels (optional) and execution time. Execution time is the time at which the MS should perform the handoff and begin using the new channel, to avoid synchronization errors that may occur when the network and MS are not using the same channel. This handoff information allows the MS to continue the connection on a new Active set synchronized with the base station(s) in the network. This handoff information may also include long-code information. The RC-MAS message is a combination of an address and hand-off information. FIG. 11 is an example format of an RC-MAS according to an embodiment of the present invention. It should be understood, however, that other embodiments may utilize different fields, bit lengths, and order of the fields. In FIG. 11, the address information contained in the RC-MAS is shown in italics, while the RC-HO information is contained in the remainder of the message. The fields of FIG. 11 are well understood by those skilled in the art.

In one embodiment of the present invention, the RC-MAS is not used to transmit user data because any MS could receive the RC-MA. Data transmission is resumed after a rescue handoff has been completed. This can occur as fast as the network can acquire the MS dedicated transmission. In another embodiment, data could be encrypted or coded for particular users, thereby allowing user data to be sent on the RC-MA. As illustrated in FIG. 9, a multiplexer 126 could receive signaling messages 128 as control inputs, and encrypted data directed to multiple MSs 130 as data inputs.

In one embodiment of the present invention, within the RC-MA the RC-MAS messages are transmitted repeatedly, potentially cycling through the MSs requiring rescue, until the failing MSs successfully receive the RC-MA and execute the RC-HO. Once the network detects the successful RC-HO of all failing MSs or all the rescue procedure time limits expire, use of the RC-MA can be terminated.

Figure 12:
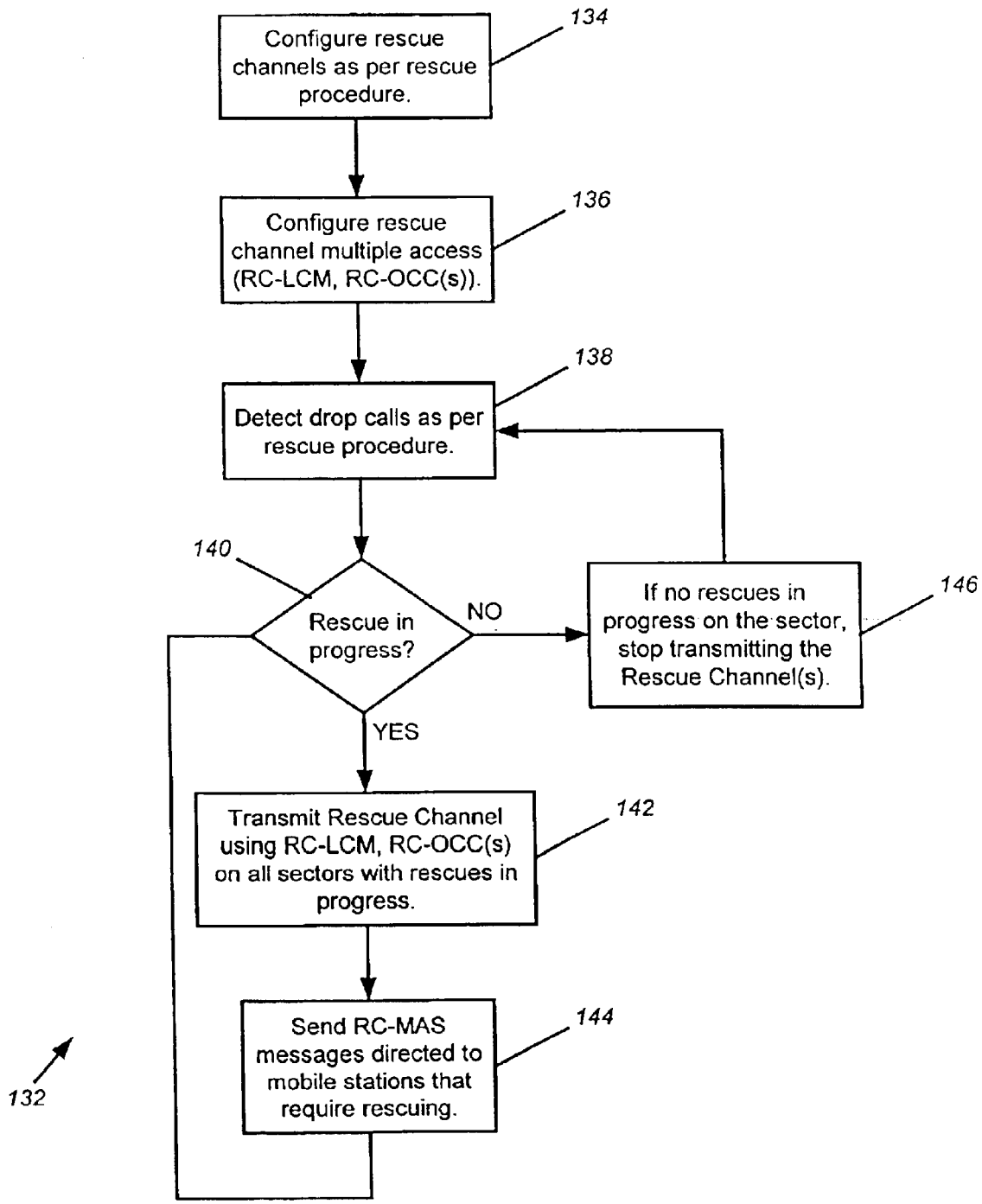
FIG. 12 is a flowchart of a network (infrastructure) multiple-access rescue procedure according to embodiments of the present invention.

FIG. 12 is a flowchart of a network (infrastructure) multiple-access rescue procedure 132 according to embodiments of the present invention. Note that FIG. 12 does not explicitly show the transmission of overheads carrying the RC-LCM, RC-OC, or other rescue configuration information described above. However, it should be understood that this is performed before the rescue procedure is activated. The infrastructure forward rescue channel configuration 134 is completed either through predetermined configuration parameters, based on current conditions, or by adapting to available channels and resources in the network. The multiple access nature of the rescue channel is configured through the RC-LCM or RC-OC(s) 136. The infrastructure monitors connections with MSs to detect potentially failing MSs 138. The infrastructure checks if there are any rescues in progress, or if there are any rescues starting 140. If a rescue is starting or in progress, or optionally may be starting, then the process proceeds to step 142 where the BS(s) (sectors) in the network transmit the RC-MA using the configuration determined in 136 and 134. Within the RC-MA, the infrastructure sends RC-MAS messages directed to MSs that require rescuing 144. MSs may be rescued one at a time by sequentially sending RC-MAS messages directed to those MS. Alternatively, if there is no rescue in progress or starting, then the process proceeds to step 146 where the network stops transmitting the RC-MA.

Forward-Link RC-MA Receiver

Figure 13:
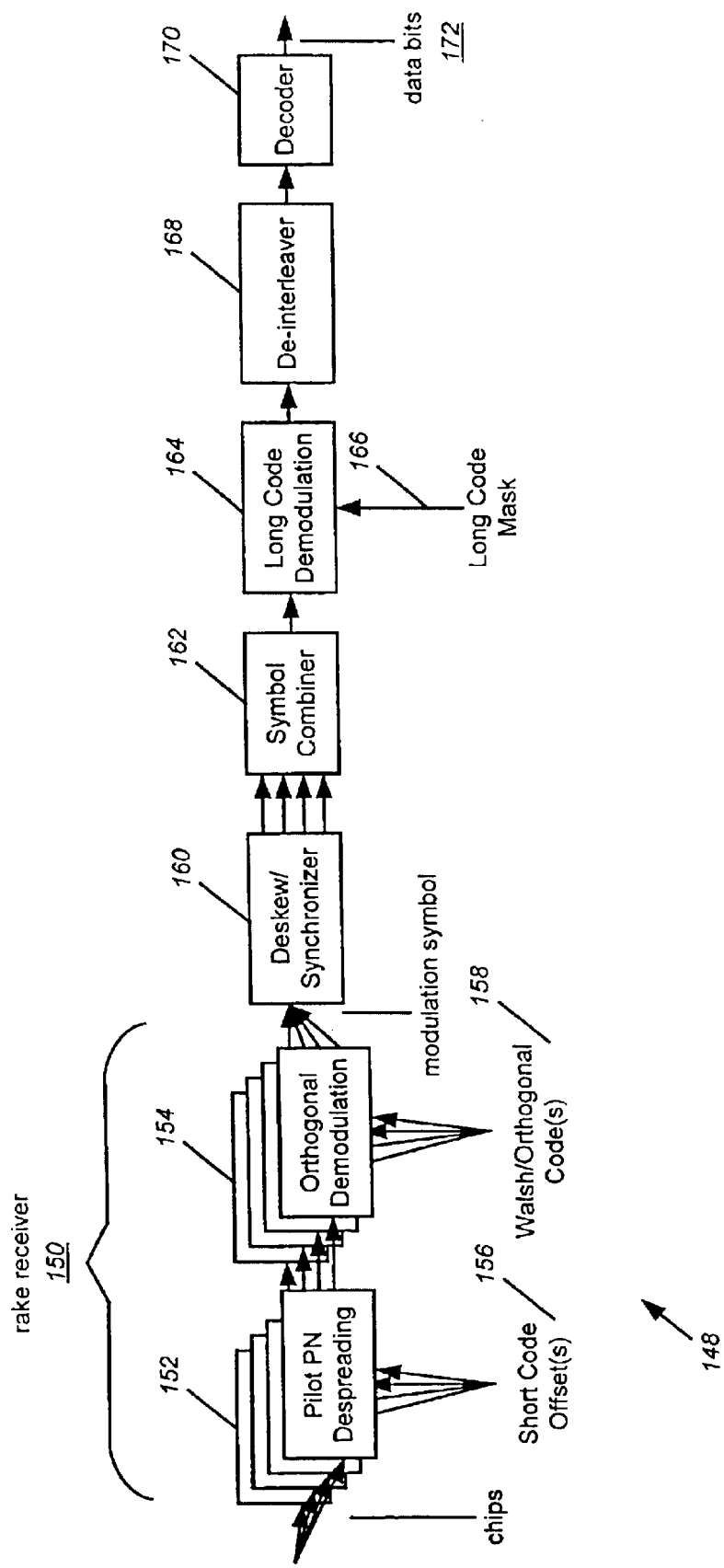
FIG. 13 is a block diagram of a forward channel receiver implemented in a MS transceiver that may be configured for receiving a signaling message on the multiple-access rescue channel according to an embodiment of the present invention.

FIG. 13 is a block diagram of a forward channel receiver 148 implemented in a MS transceiver that may be configured for receiving data on a forward traffic channel, for example, or a signaling message on the RC-MA according to an embodiment of the present invention. The forward channel receiver includes a rake receiver 150, which includes a number of pilot PN de-spreaders 152 and orthogonal demodulators 154. Each de-spreader/demodulator pair, i.e. rake receiver finger, may be assigned to a separate sector (using pilot PN/short code offset 156) and channel (using orthogonal code 158). During rescue, each rake receiver finger in the failing MS may be assigned to a different sector that may be transmitting the RC-MA for the purpose of receiving the RC-MA. Note that even if multiple sectors used the same RC-OC and RC-LCM, the RC-MAs transmitted by each sector are technically unique because the PN spreading is unique to each sector. However, these RC-MAs will be referred to herein as a single rescue channel. The pilot PN/short code offset 156 that identifies these sectors, and the RC-OC and RC-LCM that identifies the RC-MA were known by the MS or communicated to the MS in advance of the detection of the potentially failing connection. The scrambled channel data is then deskewed 160 to properly align the channels.

The deskewed RC-MAs received from these sectors by the rake receiver fingers are combined 162 and unscrambled 164 using the same private long code mask 166 used by the network to scramble the RC-MA. The unscrambled channel data is then deinterleaved 168 and decoded 170 to produce the rescue signaling information 172. Note that because orthogonal modulation/demodulation, long code spreading/despreading, and PN spreading/despreading are linear operations, they can theoretically be performed in any order. However, in the forward link receiver 148 of FIG. 13, PN despreading 152 should be performed first, because it is desirable to remove the sectorization from the channel data before performing long code demodulation 164, which is a complex operation.

Because all MSs can demodulate the RC-MA, a MS will not suffer from interference if it demodulates the RC-MA while it is being used to rescue another MS. In addition, a MS will not suffer from interference if it attempts to demodulate the RC-MA from a sector that is not transmitting the RC-MA, because the finger output for that sector will be near the noise floor.

Figure 14:
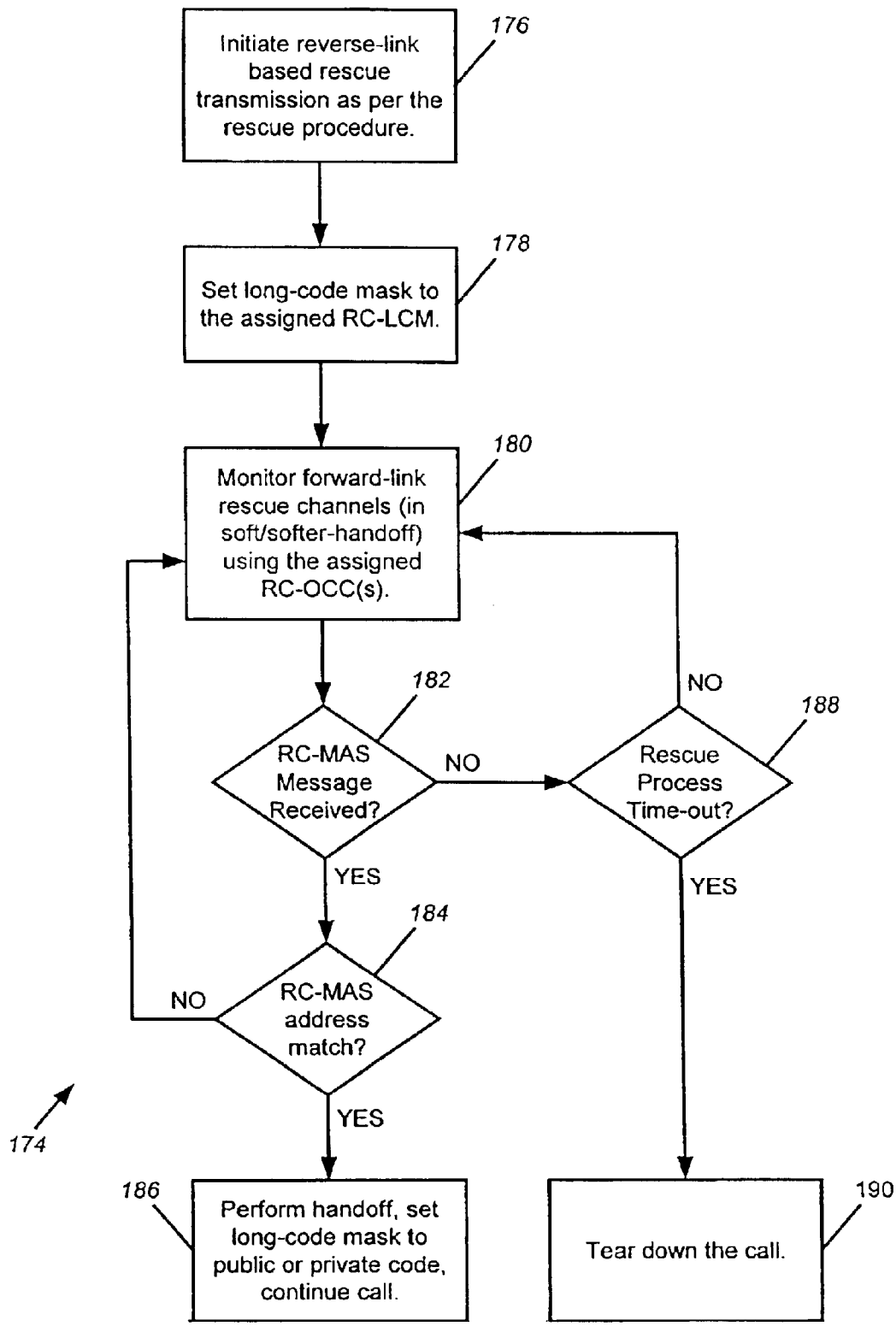
FIG. 14 shows a flowchart of an exemplary reverse-link initiated embodiment of the MS rescue process including the multiple-access rescue procedure according to embodiments of the present invention.

FIG. 14 shows a flowchart 174 of an exemplary reverse-link initiated embodiment of the MS rescue process including the multiple-access rescue procedure according to embodiments of the present invention. The process starts when the MS initiates the reverse-link rescue transmission 176, as described above. The MS then uses the RC-LCM in its forward-link receiver to attempt to decode the RC-MA 178. The MS monitors for the RC-MA using the assigned RC-OC(s) 180. This may include monitoring multiple sectors at the same time, using its rake receiver fingers. Decision block 182 checks if an RC-MAS message was received. If a message was received, then the procedure checks, in block 184, if there is an address match (i.e. if the message is for this MS). If the address matches, then the MS acts on the instructions contained in the message for handoff and continues the connection as shown in 186. If no message is received, then the process determines, in 188, if the rescue process has timed out. If the process has timed-out, then the connection is terminated in block 190. If the RC-MAS message address does not match or if no message was received but the process has not yet timed-out, then the procedure continues back to block 180 to continue monitoring for a message.

Note that in FIGS. 12 and 14, the rescue procedure itself is not described in detail, because the present invention is compatible with a plurality of rescue procedures.

Communications Prior to Rescue

The RC-LCM can be assigned and communicated to MSs in advance of any need for rescue via overheads on the broadcast channel (common channels) and traffic channels (dedicated channels) on a per-sector basis, or they can be pre-defined in standards or provisioned in MSs. The RC-LCM may be the same as that used on other common channels, or may be selected to be different. Note that the RC-LCM is common to all sectors that may be involved in the rescue or identified by the MS as rescue sectors, because rescue sector transmissions are combined at the MS receiver. However, certain portions of a network that are isolated could use the same or different RC-LCM as another isolated portion of the network.

The RC-OC may be similarly assigned or communicated. However, the RC-OC may be different for each sector as long as the RC-OCs are communicated to the MSs so that they may attempt demodulation of the RC-MA from these sectors in the rake receiver fingers. The RC-OCs for handoff sectors may be known to the failing MS, for example, if the MSs receive a neighbor rescue list containing neighboring pilots and the RC-OCs for their RC-MAs. In another embodiment, all sectors in the network may use different orthogonal codes. This provides each sector with the flexibility to change the orthogonal code, and therefore its RC-MA, depending on the availability of orthogonal codes in the network.

In one embodiment of the present invention the RC-OCs are used for rescue only, and not normal dedicated or common channel usage. Additionally, BSs would only transmit the RC-MA when rescues are in progress, and only BSs that are possible rescuing sectors should transmit the RC-MA.

Multiple-Access Reverse-Based Rescue Example

Figure 15:
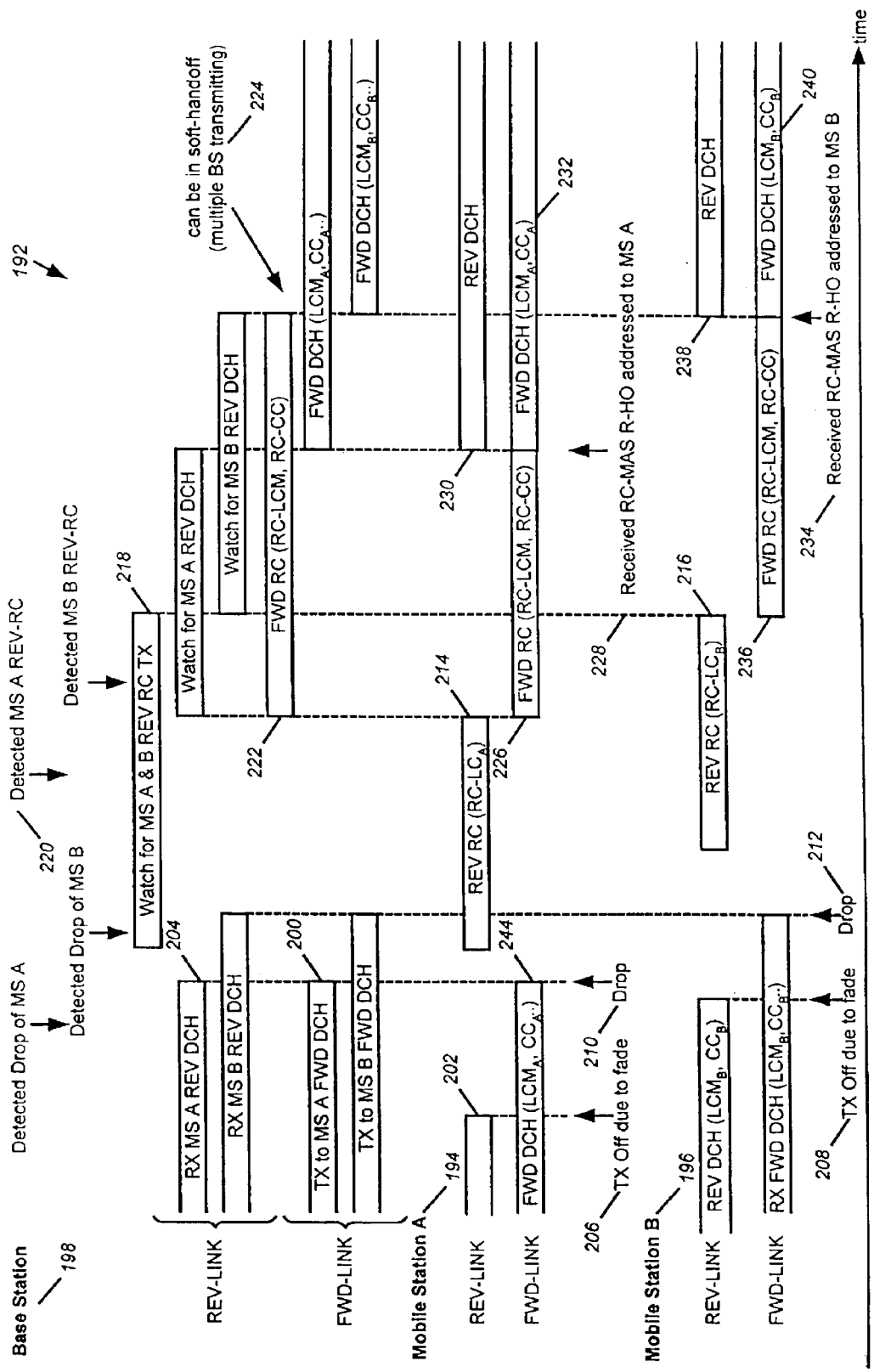
FIG. 15 shows an exemplary timing diagram of two simultaneous drop rescues using the multiple-access rescue channel method with a dedicated reverse initiated rescue procedure, according to an embodiment of the present invention.

FIG. 15 shows an exemplary timing diagram 192 of two simultaneous drop rescues using the multiple-access rescue channel method with a dedicated reverse initiated rescue procedure, according to an embodiment of the present invention. The blocks indicate when a particular channel is being communicated. FIG. 15 shows two MSs A 194 and B 196 originally in communication with BS 198. It should be understood that the BS 198 represents all BSs in the network that are participating in the rescue, as may be determined by pilot signal strength measurements taken by the failing MS, or as may be determined by the infrastructure in the BSC. Note also that the failing MS may have been in communication with more than one BS if the MS was in soft-handoff at the time of the failure. In the present example, before the start of any failures, MS A 194 was receiving forward dedicated traffic channel 244 transmitted from the BS 198 (shown transmitted from the BS as 200), and was transmitting the reverse dedicated channel 202 to the BS 198 (shown received by the BS as 204). MS B 196 is behaving similarly. Forward fade induced connection failures (detected after receiving a predetermined number of bad received frames) cause the transmitters of MS A and B to turn off at times 206 and 208, respectively. Note that MS B 196 experiences a fade failure on its connection soon after MS A 194 experiences a fade failure. If these connections are not rescued, they may typically result in dropped connections (210 and 212 for MSs A and B respectively).

Instead of waiting for the connections to drop, or instead of dropping the connections after a fade timeout, MSs A and B attempt rescues by triggering rescue procedures. At the rescue trigger point, the MSs may use the MSs' public or private long code masks presently in use for the current connection and start reverse rescue channel transmissions. In another embodiment, MSs A and B may change from their public or private long code masks to new rescue channel long code masks (e.g., RC-LC$_A$ or RC-LC$_B$, respectively) and start reverse rescue channel transmissions (214 and 216 for MSs A and B, respectively). The MSs transmit for a period of time and then watch for the network transmission of RC-MA.

The BS 198 may also detect the connection failures for MS A and B and begin to watch for the reverse rescue channel transmissions from the MSs (see reference character 218). Once the BS 198 receives the MS reverse rescue channel transmissions, it responds by transmitting RC-MA 222. For example, when the BS 198 detects the MS A reverse rescue channel transmission 220, it transmits RC-MA 222. Note that this channel can be transmitted from multiple sectors or BSs as shown by 224.

MS A monitors the RC-MA (shown received at MS A as 226) until it receives the RC-MAS RC-HO message addressed to it at time 228. Note that MS A may receive the RC-MA from one or more BSs, combining the energies of all of the RC-MA being received from the BSs. At this point, MS A has the timing and channel information to handoff to a dedicated channel (traffic channel), including both reverse 230 and forward links 232. The RC-MAS RC-HO message directs MS A to go to a new reverse dedicated channel (see 230). Although FIG. 15 shows a reverse dedicated channel 230, it should be noted that a reverse common channel may also be used. Note that LCM$_A$ and the channel code (CC$_A$) in 244 may be different from LCM$_A$ and CC$_A$ in 232, because MS A may have been assigned to a new dedicated channel after rescue, and may be communicating with a new BS after rescue. MS reverse rescue channel transmissions may terminate once the RC-MA is received.

Before a RC-MAS RC-HO message in the RC-MA is transmitted by one or more BSs to the failing MS, the network may determine that one or more BSs are receiving the failing MS better than the other BSs. In one embodiment of the present invention, the RC-MAS RC-HO message in the RC-MA will direct the failing MS to be rescued and communicate on a dedicated channel with one of the BSs that was receiving the failing MS better than the other BSs. The determination of which BSs are best for rescue occurs prior to rescue or while watching for a MS transmission in the case of reverse-based rescues, and may be based on pilot signal strength measurements, resource limitations, the last known active set of the MS, the location of the MS, the BSs closest to the MS, previous active sets for the MS, other history and statistics of the Ms, what new pilots the MS was asking for at the time of the failure, and the like.

The multiple access scheme of the present invention is independent of whether or not the MS Active set is autonomously updated, updated once at rescue procedure initialization, or updated using any other well known update method. However, in one embodiment of the present invention, the MS Active set is updated continuously and dynamically because soft-handoff can improve the demodulation of the rescue channel.

FIG. 15 illustrates that the BS transmits the RC-MAS message to MSs A and B on the same RC-MA 222. Thus, once MS A is rescued at time 228, the RC-MA bears only the RC-MAS message directed to MS B (assuming no other MSs need rescue, as in the present example). As previously noted, this message may be repeated periodically or continuously. The same RC-MA is now used to direct MS B to a dedicated channel 234.

MS B monitors the RC-MA (shown received at MS B as 236) until it receives the RC-MAS RC-HO message addressed to it at time 234. At this point, MS B has the timing and channel information to handoff to a dedicated channel (traffic channel), including both reverse 238 and forward links 240. As the BS detects other MSs in need of rescue, it may change the RC-MAS RC-HO message within the RC-MA, or may turn off the RC-MA if no other MSs need to be rescued.

The handoff BSs may start transmitting data traffic immediately after the rescue handoffs. While the rescuing BS 198 does not typically transmit any traffic data on RC-MA 222, the MSs can transmit traffic on the reverse rescue channels (214 and 216). In voice calls, for example, the audio break at the MS due to rescue is likely to be slightly longer than the audio mute at the remote end.

Note that although embodiments of the present invention have been described above as rescuing MS connections using dedicated channels, the same method may be used to rescue MS connections that use common channels. Additionally, while the term "Active set" has been used for purposes of explanation, embodiments of the present invention are equally applicable to other forms of pilot or sector maintenance, such as the eligible sector set in fast-cell site selection systems, for example.

Multiple-Access Forward-Based Rescue Example

Figure 16:
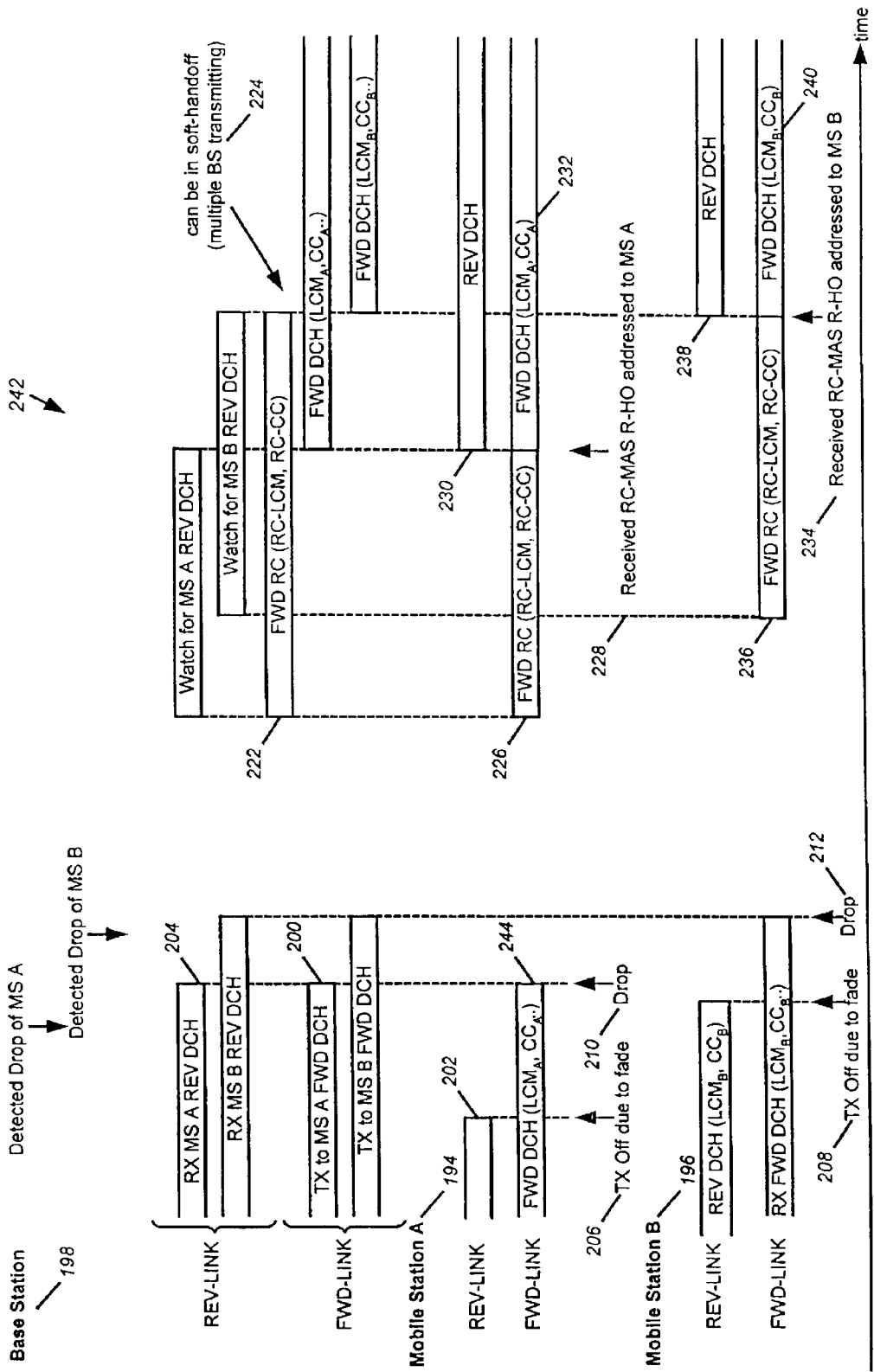
FIG. 16 illustrates the use of RC-MA in a forward based rescue procedure according to an embodiment of the present invention.

FIG. 16 shows an exemplary timing diagram 242 of two simultaneous drop rescues using the multiple-access rescue channel method with a dedicated forward initiated rescue procedure, according to an embodiment of the present invention. The blocks indicate when a particular channel is being communicated. FIG. 16 shows two MSs A 194 and B 196 originally in communication with BS 198. It should be understood that the BS 198 represents all BSs in the network that are participating in the rescue, as may be determined by pilot signal strength measurements taken by the failing MS. Note also that the failing MS may have been in communication with more than one BS if the MS was in soft-handoff at the time of the failure. In the present example, before the start of any failures, MS A 194 was receiving forward dedicated traffic channel 244 transmitted from the BS 198 (shown transmitted from the BS as 200), and was transmitting the reverse dedicated channel 202 to the BS 198 (shown received by the BS as 204). MS B 196 is behaving similarly. Forward fade induced connection failures (detected after receiving a predetermined number of bad received frames) cause the transmitters of MS A and B to turn off at times 206 and 208, respectively. Note that MS B 196 experiences a fade failure on its connection soon after MS A 194 experiences a fade failure. If these connections are not rescued, they may typically result in dropped connections (210 and 212 for MSs A and B respectively).

The BS 198 may also detect the connection failures for MS A and B. Instead of waiting for the connections to drop, or instead of dropping the connections after a fade timeout, BS 198 attempts rescues by triggering rescue procedures. Once the BS 198 detect the connection failures for MS A and B, it responds by transmitting RC-MA 222. Note that this channel can be transmitted from multiple sectors or BSs as shown by 224.

MS A monitors the RC-MA (shown received at MS A as 226) until it receives the RC-MAS RC-HO message addressed to it at time 228. Note that MS A may receive the RC-MA from one or more BSs, combining the energies of all of the RC-MA being received from the BSs. At this point, MS A has the timing and channel information to handoff to a dedicated channel (traffic channel), including both reverse 230 and forward links 232. The RC-MAS RCHO message directs MS A to go to a new reverse dedicated channel (see 230). Although FIG. 16 shows a reverse dedicated channel 230, it should be noted that a reverse common channel may also be used. Note that $LCM_A$ and $CC_A$ in 244 may be different from $LCM_A$ and $CC_A$ in 232, because MS A may have been assigned to a new dedicated channel after rescue, and may be communicating with a new BS after rescue.

Before a RC-MAS RC-HO message in the RC-MA is transmitted by one or more BSs to the failing MS, the network may determine that one or more BSs are receiving the failing MS better than the other BSs. In one embodiment of the present invention, the RC-MAS RC-HO message in the RC-MA will direct the failing MS to be rescued and communicate on a dedicated channel with one of the BSs that was receiving the failing MS better than the other BSs. The determination of which BSs are best for rescue occurs prior to rescue or while watching for a MS transmission in the case of reverse-based rescues, and may be based on pilot signal strength measurements, resource limitations, the last known active set of the MS, the location of the MS, the BSs closest to the MS, previous active sets for the MS, other history and statistics of the MS, what new pilots the MS was asking for at the time of the failure, and the like.

The multiple access scheme of the present invention is independent of whether or not the MS Active set is autonomously updated, updated once at rescue procedure initialization, or updated using any other well known update method. However, in one embodiment of the present invention, the MS Active set is updated continuously and dynamically because soft-handoff can improve the demodulation of the rescue channel.

FIG. 16 illustrates that the BS transmits the RC-MAS message to MSs A and B on the same RC-MA 222. Thus, once MS A is rescued at time 228, the RC-MA bears only the RC-MAS message directed to MS B. As previously noted, this message may be repeated periodically or continuously. MS B is rescued after MS A because only one RC-MAS RC-HO message can be communicated on RC-MA at a time. The same RC-MA is now used to direct MS B to a dedicated channel 234.

MS B monitors the RC-MA (shown received at MS B as 236) until it receives the RC-MAS RC-HO message addressed to it at time 234. At this point, MS B has the timing and channel information to handoff to a dedicated channel (traffic channel), including both reverse 238 and forward links 240. As the BS detects other MSs in need of rescue, it may change the RC-MAS RC-HO message within the RC-MA, or may turn off the RC-MA if no other MSs need to be rescued. The handoff BSs may start transmitting data traffic immediately after the rescue handoffs.

Note that although embodiments of the present invention have been described above as rescuing MS connections using dedicated channels, the same method may be used to rescue MS connections that use common channels. Additionally, while the term "Active set" has been used for purposes of explanation, embodiments of the present invention are equally applicable to other forms of pilot or sector maintenance, such as the eligible sector set in fast-cell site selection systems, for example.

Other Embodiments

In other embodiments of the present invention, a forward common channel similar to the RC-MA could also be used for handoffs, even if no failure has been detected. A MS may be in need of handoff when its signal strength measurements drop below a predetermined threshold, for example. Typically, handoff instructions are integrated into dedicated messages communicated to a particular MS. However, these dedicated messages could be replaced with a forward multiple access handoff channel (HC-MA) similar in content and operation to the RC-MA that can carry all of these handoff instructions. The HC-MA would contain a handoff channel multiple access synchronization message (HC-MAS) similar in content and operation to the RC-MAS, and a handoff channel handoff message (HC-HO) similar in content and operation to the RC-HO. Addressing would enable only those MSs in need of handoff to receive the common handoff channel.

In further embodiments of the present invention, rather than creating a separate common rescue channel RC-MA, pre-existing common channels may be used to convey the rescue information. These common channels would transmit the same information across different base stations, and would be gated off when not needed. The common channels would be transmitted to allow soft handoffs and reception by multiple MSs.

Note also that embodiments of the present invention can be generalized to communications protocols other than CDMA. As described above, in CDMA-based systems, the forward link uses PN spreading for sectorization, orthogonal codes for channelization, and long codes for privacy, while the reverse link uses long code demodulation to uniquely identify the MSs. In TDMA-based embodiments of the present invention, sectorization and channelization could be replaced by time division multiplexing. Long codes may still be used on the data for privacy, or the long codes could also be replaced by other forms of encryption, coding, or scrambling before the data is channelized. FDMA systems would be similar, with frequency division multiplexing being used for sectorization and channelization. In general, TDMA and FDMA systems would be identical to CDMA systems, except for the channelization and sectorization. For example, in CDMA systems, all sectors transmit the RC-MA to the MS, and although they are technically separate channels, they are easily combined. In TDMA, however, adjacent BSs will always be transmitting at different frequencies, and thus the separate RC-MA channels would have to individually received by the BS using multiple receivers, and the data extracted separately before combining. However, as long as the RC-MA is received from one BS, it will provide the receiving MS with the necessary rescue information.

Although the multiple-access rescue channel concepts described hereinabove used a cellular network as an example, the basic concept of establishing retry limits for rescues of connections in danger of being dropped are applicable to or may be extended to other wireless protocols and technologies such as paging systems, satellite communication systems, cordless phone systems, fleet communication systems, and the like. The concept of a BS described herein encompasses repeaters or different antenna diversity schemes, a cordless base, a satellite or another telephone, and the like. The concept of a MS described herein encompasses a pager, a satellite phone, a cordless phone, a fleet radio, and the like.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a system comprising a network and at least one mobile station (MS) for enabling communications with the at least one MS, a method for rescuing one or more MSs having connections with the network that have become potentially failing connections, comprising:

identifying the one or more MSs having potentially failing connections;

transmitting a forward multiple-access rescue channel (RC-MA) from the network, the RC-MA including a rescue channel multiple-access synchronization message (RC-MAS) comprising MS identification and handoff information specific to each of the one or more MSs having potentially failing connections and a rescue channel handoff message (RC-HO) comprising a new active set specific to each of the one or more MSs having potentially failing connections for enabling the MSs having potentially failing connections to continue the connection;

receiving the RC-MA at the one or more MSs having potentially failing connections;

handing off the one or more MSs having potentially failing connections in accordance with the MS identification and handoff information; and identifying one or more sectors that were receiving a particular MS having a potentially failing connection with a higher signal strength than other sectors, and specifying those one or more sectors in the new active set specific to that particular MS.

2. In a system comprising a network and at least one mobile station (MS) for enabling communications with the at least one MS, a method for rescuing one or more MSs having connections with the network that have become potentially failing connections, comprising:

identifying the one or more MSs having potentially failing connections;

transmitting a forward multiple-access rescue channel (RC-MA) from the network, the RC-MA including a rescue channel multiple-access synchronization message (RC-MAS) comprising MS identification and handoff information specific to each of the one or more MSs having potentially failing connections;

receiving the RC-MA from multiple sectors simultaneously at the one or more MSs having potentially failing connections; and handing off the one or more MSs having potentially failing connections in accordance with the MS identification and handoff information.

3. In a system comprising a network and at least one mobile station (MS) for enabling communications with the at least one MS, one or more MSs capable of receiving a forward multiple-access rescue channel (RC-MA) and continuing connections that have become potentially failing connections, a method for assisting in rescuing one or more MSs having potentially failing connections, comprising:

identifying the one or more MSs having potentially failing connections;

transmitting a forward multiple-access rescue channel (RC-MA) from the network, the RC-MA including a rescue channel multiple-access synchronization message (RC-MAS) comprising MS identification and handoff information specific to each of the one or more MSs having potentially failing connections and a rescue channel handoff message (RC-HO) comprising a new active set specific to each of the one or more MSs having potentially failing connections for enabling the MSs having potentially failing connections to continue the connections;

monitoring a reverse channel specific to each of the one or more MSs having potentially failing connections in accordance with the MS identification and handoff information;

transmitting one or more forward channels from the network, each forward channel in accordance with the MS identification and handoff information and specific to each of the one or more MSs having potentially failing connections that has received the RC-MA; and identifying one or more sectors that were receiving a particular MS having a potentially failing connection with a higher signal strength than other sectors, and specifying those one or more sectors in the new active set specific to that particular MS.

4. In a system comprising a network and at least one mobile station (MS) for enabling communications with the at least one MS, one or more MSs capable of receiving a forward multiple-access rescue channel (RC-MA) and continuing connections that have become potentially failing connections, a method for assisting in rescuing one or more MSs having potentially failing connections, comprising:

identifying the one or more MSs having potentially failing connections;

transmitting a forward multiple-access rescue channel (RC-MA) from the network from multiple sectors simultaneously, the RC-MA including a rescue channel multiple-access synchronization message (RC-MAS) comprising MS identification and handoff information specific to each of the one or more MSs having potentially failing connections;

monitoring a reverse channel specific to each of the one or more MSs having potentially failing connections in accordance with the MS identification and handoff information; and transmitting one or more forward channels from the network, each forward channel in accordance with the MS identification and handoff information and specific to each of the one or more MSs having potentially failing connections that has received the RC-MA.

5. In a system comprising a network and at least one mobile station (MS) for enabling communications with the at least one MS, the network capable of transmitting a forward multiple-access rescue channel (RC-MA) including a rescue channel multiple-access synchronization message (RC-MAS) comprising MS identification and handoff information specific to each of one or more MSs having connections with the network that have become potentially failing connections, a method for assisting in rescuing a MS having a potentially failing connection, comprising:

receiving the RC-MA from multiple sectors simultaneously at the MS having the potentially failing connection; and transmitting a reverse channel specific to the MS having the potentially failing connection in accordance with the MS identification and handoff information.

6. In a system comprising a network and at least one mobile station (MS) for enabling communications with the at least one MS, a method for handing off one or more MSs having a connection with the network prior to detecting a failing connection, comprising:

identifying the one or more MSs in need of handoff;

transmitting a forward multiple-access handoff channel (HC-MA) from the network, the HC-MA including a handoff channel multiple-access synchronization message (HC-MAS) comprising MS identification and handoff information specific to each of the one or more MSs in need of handoff;

receiving the HG-MA from multiple sectors simultaneously at one or more MSs in need of handoff; and handing off the one or more MSs in need of handoff in accordance with the MS identification and handoff information.

7. In a system comprising a network and at least one mobile station (MS) having connections with the network for enabling communications with the at least one MS, the one or more MSs capable of receiving a forward multiple-access handoff channel (HC-MA) and continuing the connections, a method for assisting in handing off the one or more MSs prior to detecting potentially failing connections, comprising:

identifying the one or more MSs in need of handoff;

transmitting the HC-MA from the network from multiple sectors simultaneously, the HC-MA including a handoff channel multiple-access synchronization message (HC-MAS) comprising MS identification and handoff information specific to each of the one or more MSs in need of handoff;

monitoring a reverse channel specific to each of the one or more MSs in need of handoff in accordance with the MS identification and handoff information; and transmitting one or more forward channels from the network, each forward channel in accordance with the MS identification and handoff information and specific to each of the one or more MSs in need of handoff that has received the HC-MA.

8. A system for enabling communications between a network and at least one mobile station (MS) and for rescuing one or more MSs having connections with the network that have become potentially failing connections, the system comprising:

a network having a network processor programmed for
identifying the one or more MSs having potentially failing connections, transmitting a forward multiple-access rescue channel (RC-MA) from the network, the RC-MA including a rescue channel multiple-access synchronization message (RC-MAS) comprising MS identification and handoff information specific to each of the one or more MSs having potentially failing connections and a rescue channel handoff message (RC-HO) comprising a new active set specific to each of the one or more MSs having potentially failing connections for enabling the MSs having potentially failing connections to continue the connection, monitoring a reverse channel specific to each of the one or more MSs having potentially failing connections in accordance with the MS identification and handoff information, transmitting one or more forward channels from the network, each forward channel in accordance with the MS identification and handoff information and specific to each of the one or more MSs having potentially failing connections that has received the RC-MA, and identifying one or more sectors that were receiving a particular MS having a potentially failing connection with a higher signal strength than other sectors, and specifying those one or more sectors in the new active set specific to that particular MS; and one or more MSs, each MS having a MS processor programmed for receiving the RC-MA and transmitting a reverse channel in accordance with the MS identification and handoff information if that MS has potentially failing connection.

9. A system for enabling communications between a network and at least one mobile station (MS) and for rescuing one or more MSs having connections with the network that have become potentially failing connections, the system comprising:

a network having a network processor programmed for
identifying the one or more MSs having potentially failing connections,
transmitting a forward multiple-access rescue channel (RC-MA) from the network, the RC-MA including a rescue channel multiple-access synchronization message (RC-MAS) comprising MS identification and handoff information specific to each of the one or more MSs having potentially failing connections,
monitoring a reverse channel specific to each of the one or more MSs having potentially failing connections in accordance with the MS identification and handoff information, and
transmitting one or more forward channels from the network, each forward channel in accordance with the MS identification and handoff information and specific to each of the one or more MSs having potentially failing connections that has received the RC-MA; and one or more MSs, each MS having a MS processor programmed for receiving the RC-MA from multiple sectors simultaneously and transmitting a reverse channel in accordance with the MS identification and handoff information if that MS has potentially failing connection.

10. A system for enabling communications between a network and at least one mobile station (MS) and for rescuing one or more MSs having connections with the network that have become potentially failing connections, the system comprising:

a network having a network processor programmed for
identifying the one or more MSs having potentially failing connections,
transmitting a forward multiple-access rescue channel (RC-MA) from the network from multiple sectors simultaneously, the RC-MA including a rescue channel multiple-access synchronization message (RC-MAS) comprising MS identification and handoff information specific to each of the one or more MSs having potentially failing connections,
monitoring a reverse channel specific to each of the one or more MSs having potentially failing connections in accordance with the MS identification and handoff information, and
transmitting one or more forward channels from the network, each forward channel in accordance with the MS identification and handoff information and specific to each of the one or more MSs having potentially failing connections that has received the RC-MA; and one or more MSs, each MS having a MS processor programmed for receiving the RC-MA and transmitting a reverse channel in accordance with the MS identification and handoff information if that MS has potentially failing connection.

11. A system for enabling communications between a network and at least one mobile station (MS) and for assisting in rescuing one or more MSs having potentially failing connections, the one or more MSs capable of receiving a forward multiple-access rescue channel (RC-MA) and continuing connections that have become potentially failing connections, the system comprising:

a network including a network processor programmed for
identifying the one or more MSs having potentially failing connections,
transmitting a forward multiple-access rescue channel (RC-MA), the RC-MA including a rescue channel multiple-access synchronization message (RC-MAS) comprising MS identification and handoff information specific to each of the one or more MSs having potentially failing connections and a rescue channel handoff message (RC-HO) comprising a new active set specific to each of the one or more MSs having potentially failing connections fort enabling the MSs having potentially failing connections to continue the connections,
monitoring a reverse channel specific to each of the one or more MSs having potentially failing connections in accordance with the MS identification and handoff information,
transmitting one or more forward channels from the network, each forward channel in accordance with the MS identification and handoff information and specific to each of the one or more MSs having potentially failing connections that has received the RC-MA, and
identifying one or more sectors that were receiving a particular MS having a potentially failing connection with a higher signal strength than other sectors, and specifying those one or more sectors in the new active set specific to that particular MS.

12. A system for enabling communications between a network and at least one mobile station (MS) and for assisting in rescuing one or more MSs having potentially failing connections, the one or more MSs capable of receiving a forward multiple-access rescue channel (RC-MA) and continuing connections that have become potentially failing connections, the system comprising:

a network including a network processor programmed for
identifying the one or more MSs having potentially failing connections,
transmitting a forward multiple-access rescue channel (RC-MA) from multiple sectors simultaneously, the RC-MA including a rescue channel multiple-access synchronization message (RC-MAS) comprising MS identification and handoff information specific to each of the one or more MSs having potentially failing connections,
monitoring a reverse channel specific to each of the one or more MSs having potentially failing connections in accordance with the MS identification and handoff information, and
transmitting one or more forward channels from the network, each forward channel in accordance with die MS identification and handoff information and specific to each of the one or more MSs having potentially failing connections that has received the RC-MA.

13. A mobile station (MS) for communicating with a network and for assisting in rescuing the MS when the MS has a connection with the network that has become a potentially failing connection, the network capable of transmitting a forward multiple-access rescue channel (RC-MA) including a rescue channel multiple-access synchronization message (RC-MAS) comprising MS identification and handoff information specific to each of one or more MSs having connections with the network that have become potentially failing connections, the MS comprising:

a MS processor programmed for
receiving the RC-MA from multiple sectors simultaneously at the MS if the MS has a potentially failing connection, and
transmitting a reverse channel in accordance with the MS identification and handoff information if the MS has a potentially failing connection.

14. A system for enabling communications between a network and at least one mobile station (MS) and for handing off one or more MSs having a connection with the network prior to detecting a failing connection, comprising:

a network including a network processor programmed for identifying the one or more MSs in need of handoff,
transmitting a forward multiple-access handoff channel (HC-MA) from the network, the HC-MA including a handoff channel multiple-access synchronization message (HC-MAS) comprising MS identification and handoff information specific to each of the one or more MSs in need of handoff,
monitoring a reverse channel specific to each of the one or more MSs in need of handoff in accordance with the MS identification and handoff information, and
transmitting one or more forward channels from the network, each forward channel in accordance with the MS identification and handoff information and specific to each of the one or more MSs in need of handoff that has received the HC-MA; and a MS including a MS processor programmed for
receiving the HC-MA from multiple sectors simultaneously at one or more MSs in need of handoff, and
transmitting a reverse channel from the one or more MSs in need of handoff in accordance with the MS identification and handoff information.

15. A system for enabling connections between a network and at least one mobile station (MS) and assisting in handing off one or more MSs prior to detecting potentially failing connections, the one or more MSs capable of receiving a forward multiple-access handoff channel (HC-MA) and continuing the connections, the system comprising:

a network including a network processor programmed for identifying one or more MSs in need of handoff,
transmitting the HC-MA from the network from multiple sectors simultaneously, the HC-MA including a handoff channel multiple-access synchronization message (HC-MAS) comprising MS identification and handoff information specific to each of the one or more MSs in need of handoff,
monitoring a reverse channel specific to each of the one or more MSs in need of handoff in accordance with the MS identification and handoff information, and
transmitting one or more forward channels from the network, each forward channel in accordance with the MS identification and handoff information and specific to each of the one or more MSs in need of handoff that has received the HC-MA.

* * * * *